United States Patent
Fodor et al.

(10) Patent No.: US 11,206,091 B2
(45) Date of Patent: Dec. 21, 2021

(54) METHOD AND SYSTEM OF A WIRELESS COMMUNICATION NETWORK FOR DETECTING NEIGHBOURING UES, OF A FIRST UE

(71) Applicant: Telefonaktiebolaget LM Ericsson (publ), Stockholm (SE)

(72) Inventors: Gabor Fodor, Hässelby (SE); Carlos F. M. Silva, Ceará (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/772,347

(22) PCT Filed: Nov. 10, 2015

(86) PCT No.: PCT/SE2015/051193
§ 371 (c)(1),
(2) Date: Apr. 30, 2018

(87) PCT Pub. No.: WO2017/082781
PCT Pub. Date: May 18, 2017

(65) Prior Publication Data
US 2018/0323883 A1    Nov. 8, 2018

(51) Int. Cl.
*H04B 17/318* (2015.01)
*H04W 76/14* (2018.01)
(Continued)

(52) U.S. Cl.
CPC .......... *H04B 17/318* (2015.01); *H04W 4/70* (2018.02); *H04W 8/005* (2013.01); *H04W 64/00* (2013.01); *H04W 76/14* (2018.02); *H04W 24/10* (2013.01)

(58) Field of Classification Search
CPC .... H04B 17/318; H04W 8/005; H04W 76/14; H04W 4/70; H04W 64/00; H04W 24/10
See application file for complete search history.

(56) References Cited

U.S. PATENT DOCUMENTS

| 2007/0123271 A1* | 5/2007 | Dickinson | H04W 64/00 455/456.1 |
| 2009/0197598 A1* | 8/2009 | Fischer | H04W 48/10 455/434 |

(Continued)

FOREIGN PATENT DOCUMENTS

| WO | WO/2011/121374 | 10/2011 |
| WO | WO/2012/170794 | 12/2012 |

(Continued)

OTHER PUBLICATIONS

Z. Becvar, P. Mach, M. Vondra, "Optimization of SINR-based Neighbor Cell List for Networks with Small Cells", in 2013 IEEE 24th Annual International Symposium on Personal, Indoor, and Mobile Radio Communications (PIMRC), Sep. 2013, pp. 2346-2351.

(Continued)

*Primary Examiner* — Un C Cho
*Assistant Examiner* — Yu-Wen Chang
(74) *Attorney, Agent, or Firm* — Sage Patent Group

(57) ABSTRACT

A method is performed by a system of a wireless communication network, for detecting neighboring UEs of a first UE that is wirelessly connected to a first base station. The method includes receiving power measurements performed on signals received at the first UE, which signals are sent from base stations, each power measurement being associated with an ID of the base station from which the signal was sent. The method further includes receiving power measurements of signals received at a second UE that is wirelessly connected to a second base station, each power measurement being associated with an ID of the base station from which the signal was sent. The method further includes determining a correlation between the received power measurements of the first and second UEs, and based on the determined (Continued)

correlation, determining whether the second UE is a neighbor to the first UE.

23 Claims, 9 Drawing Sheets

(51) Int. Cl.
*H04W 4/70* (2018.01)
*H04W 64/00* (2009.01)
*H04W 8/00* (2009.01)
*H04W 24/10* (2009.01)

(56) References Cited

U.S. PATENT DOCUMENTS

| | | | | |
|---|---|---|---|---|
| 2011/0294499 | A1* | 12/2011 | Vikberg | H04W 24/02 455/423 |
| 2012/0300754 | A1* | 11/2012 | Rosenqvist | H04B 7/024 370/336 |
| 2013/0003572 | A1* | 1/2013 | Kim | H04W 64/00 370/252 |
| 2013/0023272 | A1* | 1/2013 | Watanabe | H04W 36/00835 455/438 |
| 2013/0079033 | A1 | 3/2013 | Gupta et al. | |
| 2013/0084892 | A1 | 4/2013 | Teyeb et al. | |
| 2013/0170470 | A1 | 7/2013 | Kneckt | |
| 2013/0237231 | A1* | 9/2013 | Nagaraja | H04W 24/02 455/438 |
| 2014/0051357 | A1* | 2/2014 | Steer | H04L 63/0876 455/41.2 |
| 2014/0204847 | A1* | 7/2014 | Belleschi | H04W 76/14 370/329 |
| 2014/0301511 | A1 | 10/2014 | Wax et al. | |
| 2014/0342728 | A1* | 11/2014 | Dhanda | H04W 48/16 455/422.1 |
| 2014/0357269 | A1* | 12/2014 | Zhou | H04W 76/14 455/434 |
| 2015/0063095 | A1* | 3/2015 | Deng | H04W 24/04 370/221 |
| 2018/0160364 | A1* | 6/2018 | Wang | H04W 48/16 |

FOREIGN PATENT DOCUMENTS

| | | |
|---|---|---|
| WO | WO 2014/021771 A2 | 2/2014 |
| WO | WO/2016/003333 | 1/2016 |

OTHER PUBLICATIONS

International Search Report and Written Opinion of the International Searching Authority, PCT/SE2015/051193, dated Aug. 5, 2016, 9 pages.

* cited by examiner

METHOD AND SYSTEM OF A WIRELESS COMMUNICATION NETWORK FOR DETECTING NEIGHBOURING UES, OF A FIRST UE

CROSS REFERENCE TO RELATED APPLICATIONS

This application is a 35 U.S.C. § 371 national stage application of PCT International Application No. PCT/SE2015/051193 filed on Nov. 10, 2015, the disclosure and content of which is incorporated by reference herein in its entirety.

TECHNICAL FIELD

The present disclosure relates generally to methods, network nodes, user equipments, UEs, and computer programs in a wireless communication system, for finding neighboring UEs with which a first UE may be able to communicate directly, so called device-to-device, D2D, communication, in a wireless communication system.

BACKGROUND

When D2D communication is enabled in a wireless communication system, it is required for each D2D-capable UE to find its neighbors, i.e. other D2D-capable UEs in close physical proximity, with whom it can communicate directly. The wireless communication system may be e.g. a Wireless Local Area Network, WLAN, or a cellular system such as Wideband Code Division Multiple Access, W-CDMA, or Long Term Evolution, LTE.

There are prior art methods for a D2D-capable UE to find its neighbors. In one type of method, as described in the published patent applications US20130170470 and WO2012170794, a so called decentralized beaconing mechanism is described where a first D2D-capable UE sends a beacon signal for other D2D-capable UEs to respond to. Based on the received power of signals sent from the other D2D-capable UEs in response to the sent beacon signal, the first D2D-capable UE may calculate which of the other UEs that is the best for D2D communication.

A problem with such methods is the time it takes to discover the D2D-capable UEs. If this discovery process would take too long, it may be useless, since no time is left for data transmission, and the neighboring UEs and the first UE may have moved since the discovery process started. Also, good stopping criteria for stopping such a discovery process are difficult to effectively define, especially since the surrounding environment is unknown and in an area around the first UE there may be everything from only a few UEs to a large number of UEs.

Another problem with such a method is the high consumption of battery power for the UEs. This is especially a problem if the amount of possible neighboring UEs is large. Further, an exchanging protocol has to be defined between the D2D-enabled UEs to make them react on each other's beaconing signals. This also implies that more network signaling will take place in the network. There is also an increased risk of a security attack if a UE that fakes its ID sends and receives beaconing signals to from other D2D-enabled UEs.

Consequently, there is a need for an improved mechanism for a first D2D-enabled UE to discover neighboring D2D-enabled UEs. Especially, there is a need for an improved mechanism for a first D2D-enabled UE to discover neighboring D2D-enabled UEs that are in other cells than the cell of the first UE, for example close to the first UE but on another side of a cell border.

SUMMARY

It is an object of the invention to address at least some of the problems and issues outlined above. It is possible to achieve these objects and others by using methods, systems, UEs and computer programs as defined in the attached independent claims.

According to one aspect, a method is provided performed by a system of a wireless communication network 100, for detecting neighboring UEs of a first UE that is wirelessly connected to a first base station of the network. The method comprises receiving power measurements performed on signals received at the first UE, which signals are sent from base stations in the vicinity of the first UE, each received power measurement being associated with an ID of the base station from which the signal was sent, and receiving power measurements of signals received at a second UE that is wirelessly connected to a second base station of the network, different from the first base station, which signals are sent from base stations in the vicinity of the second UE, each power measurement being associated with an ID of the base station from which the signal was sent. The method further comprises determining a correlation between the received power measurements of the first UE and the received power measurements of the second UE, and based on the determined correlation, determining whether the second UE is a neighbor to the first UEa method is provided.

According to another aspect, a method is provided performed by a first UE wirelessly connected to a first base station of a wireless communication network, for detecting neighboring UEs of the first UE. The method comprises sending, to the first base station, power measurements performed on signals received from base stations in the vicinity of the first UE, each power measurement being associated with an ID of the base station from which the signal was received. The method further comprises receiving, from the first base station, information of one or more second UEs that is/are wirelessly connected to a different base station than the first base station, information indicating that the one or more second UEs has been determined to be a neighbor to the first UE based on correlations between the power measurements of the first UE and corresponding power measurements of individual of the one or more second UE, and sending a signal to at least one of the one or more second UE, based on the received information, for device to device communication with the at least one of the one or more second UE.

According to another aspect, a system is provided operable in a wireless communication network configured for detecting neighboring UEs of a first UE that is wirelessly connected to a first base station of the network. The system comprises a processor and a memory. The memory contains instructions executable by said processor, whereby the system is operative for receiving power measurements performed on signals received at the first UE, which signals are sent from base stations in the vicinity of the first UE, each received power measurement being associated with an ID of the base station from which the signal was sent, and receiving power measurements of signals received at a second UE that is wirelessly connected to a second base station of the network, different from the first base station, which signals are sent from base stations in the vicinity of the second UE, each power measurement being associated with an ID of the base station from which the signal was sent. The system is further operative for determining a correlation between the received power measurements of the first UE and the received power measurements of the second UE, and based on the determined correlation, determining whether the second UE is a neighbor to the first UE.

According to another aspect, a first UE is provided, configured to be wirelessly connected to a first base station of a wireless communication network, the first UE being operable for detecting neighboring UEs of the first UE. The first UE comprises a processor and a memory, said memory containing instructions executable by said processor, whereby the first UE is operative for sending to the first base station, power measurements performed on signals received from base stations in the vicinity of the first UE, each power measurement being associated with an ID of the base station from which the signal was received. The first UE is further operative for receiving, from the first base station, information of one or more second UEs that is/are wirelessly connected to a different base station than the first base station, information indicating that the one or more second UEs has been determined to be a neighbor to the first UE based on correlations between the power measurements of the first UE and corresponding power measurements of individual of the one or more second UE, and for sending a signal to at least one of the one or more second UE, based on the received information, for device to device communication with the at least one of the one or more second UE.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
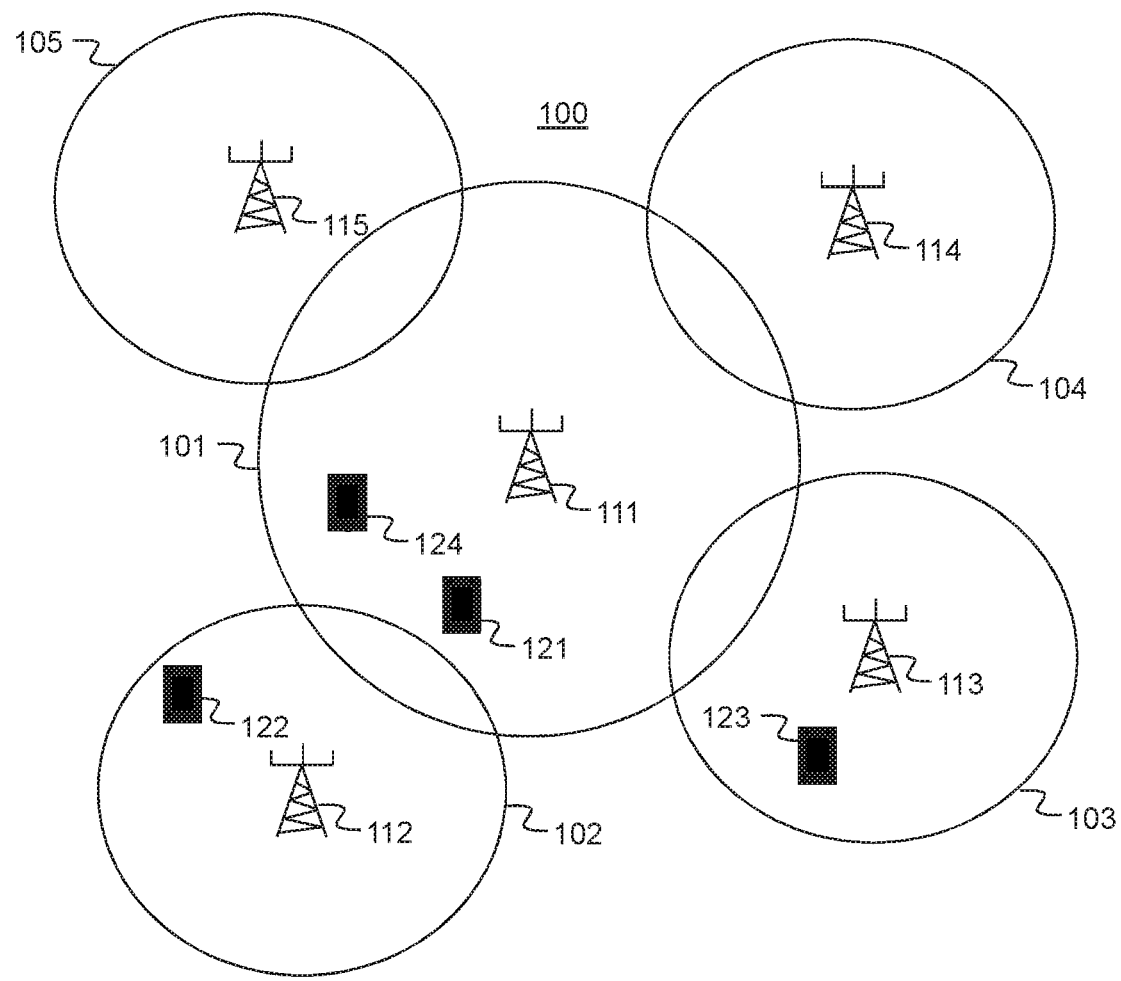
FIG. 1 is an overview of an exemplary cellular communication network showing a possible communication scenario in which the present invention may be used.

Briefly described, a solution is provided to find neighboring UEs in other cells with which a first UE can communicate D2D. This is achieved, according to an embodiment, by a network node receiving measurements from a candidate second UE in another cell than the first UE, measurements of signal quality of base station signals sent from neighboring base stations to the second UE. These measurements are thereafter compared to measurements of signal quality of base station signals sent from neighboring base stations to the first UE. Thereafter, the measurements for the first and the measurements for the second UE that are from the same base stations are compared to determine a correlation between these comparable values. If the correlation is high enough, e.g. above a threshold, the first and the second UE are determined to be neighbors. In an embodiment, the measurements that are to be compared are from base stations that are within the both the neighboring cell list of the base station to which the first UE is connected and the neighboring cell list of the base station to which the second UE is connected, a so called common cell list. Thereby, the number of signals that are to be measured and compared can be lowered compared to if all BSs stations are analyzed.

Today, a UE is instructed to receive and measure power on pilot signals transmitted by neighboring base stations, BS, defined in a neighbor cell list, NCL. The UE is also instructed to transmit the values of the measured powers to its serving BS. Also, each UE and each BS have a unique local and/or global identification, ID. Since each BS and each UE have a unique ID, the serving BS knows from which UE each measured value comes and for which neighboring BS it is reported. Therefore, the measurement values from different UEs can be organized depending on to which neighboring BS the value relates.

Further, the measurement values relating to the same neighboring BS for two UEs that are in the vicinity of each other are have proven to be highly correlated. Therefore, by analyzing the correlation of measurement values from two UEs, an estimation of the distance between two UEs can be determined. The closer the two UEs are to each other, the higher the correlation. In an embodiment, the measurement values are organized and sorted into power vectors, one vector for each reporting UE. In each power vector, the measurement values are sorted in a BS order, so that measurement values for the same BS are placed in the same position for each power vector. A correlation metric is then calculated between two vectors as an estimation of the distance between two UEs. The individual correlation metrics may then be compared with a neighbor threshold. Such a process can be repeated for all served UEs, building a pool of neighbor UEs for each UE, in other words, a cluster of UEs centered on a first UE, for neighbors to the first UE. The IDs of the UEs in the pool of neighbor UEs may be stored in the BS. The IDs of the UEs in the pool may then be provided to the first UE, for example on request from the first UE. The first UE then has a limited set of UEs which are more likely to be able for D2D communication in the cell and the first UE can in an efficient way evaluate real channel conditions for establishing a D2D link with a suitable UE.

FIG. 1 shows an example of a wireless communication network 100 in which the present invention may be used. The exemplary communication system comprises a first BS 111 providing wireless communication to UEs being in a geographical area of a first cell 101, and four further BSs, 112, 113, 114 and 115, each BS providing wireless communication to UEs being in a coverage area of a respective cell 102, 103, 104 and 105. In the first cell 101 there are in this exemplary scenario two UEs, a first UE 121 and another UE 124. Further, there is a second UE 122 connected to a second BS 112, and a third UE 123 connected to a third BS 113. To determine which UEs that are neighbors to each other, all four UEs 121-124 are instructed by its serving BS to perform power measurements on signals, e.g. pilot signals, sent from its neighboring BSs. To limit the number of signals that has to be analyzed for determining whether the first and the second UE are neighbors, the UEs are instructed to perform measurements on the signals that are coming from BSs that are both in the neighboring cell list of the first BS 111 and in the neighboring cell list of the second BS 112.

Figure 2:
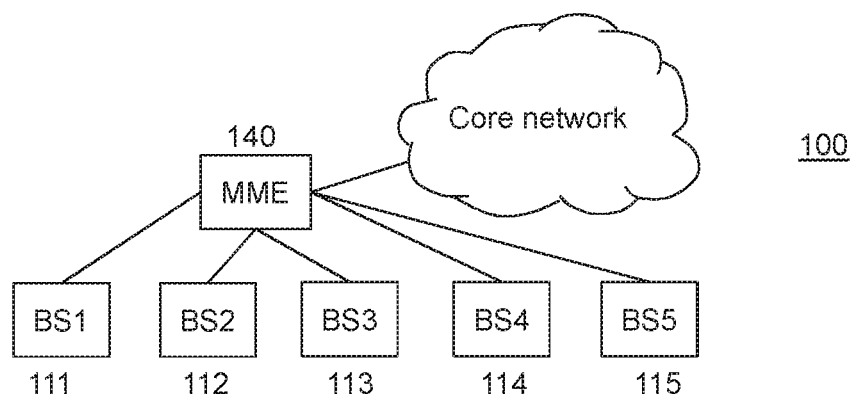
FIG. 2 is a block diagram of an exemplary communication network in which the present invention may be used.

FIG. 2 defines how the five base stations 111-115 in FIG. 1 are connected higher up in the communication network. In this example, the communication network 100 is a Long Term Evolution, LTE, network, wherein all five BSs 111-115 are connected to one Mobility Management Entity, MME 140. However, they may be connected to different MMEs. Also, the invention is applicable in other communication networks than LTE, e.g. Global System for Mobile communication, GSM, Third Generation, 3G, Wideband Code Division Multiple Access, W-CDMA etc., in which other entities are used in the position of the MME in the LTE network.

Figure 3:
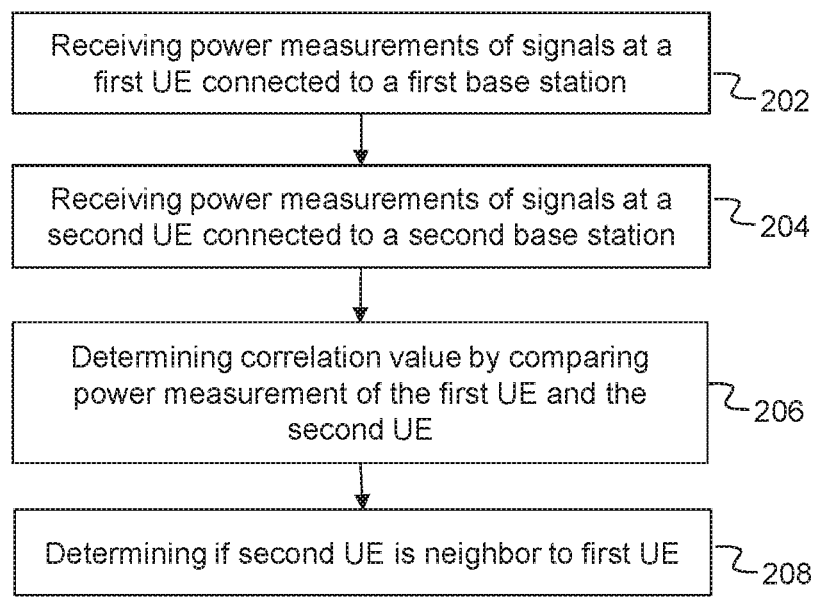
FIG. 3 is a flow chart illustrating a method in a system, according to possible embodiments.

FIG. 3, in connection with the example of FIG. 1 illustrates a method performed by a system of a wireless communication network 100, for detecting neighboring UEs of a first UE 121 that is wirelessly connected to a first base station 111 of the network. The method comprises receiving 202 power measurements performed on signals received at the first UE, which signals are sent from base stations in the vicinity of the first UE, each received power measurement being associated with an ID of the base station from which the signal was sent, and receiving 204 power measurements of signals received at a second UE that is wirelessly connected to a second base station of the network, different from the first base station, which signals are sent from base stations in the vicinity of the second UE, each power measurement being associated with an ID of the base station from which the signal was sent. The method further comprises determining 206 a correlation between the received power measurements of the first UE and the received power measurements of the second UE, and based on the determined correlation, determining 208 whether the second UE is a neighbor to the first UE.

That the signals are sent from base stations in the vicinity of the first UE and from base stations in the vicinity of the second UE, respectively, signifies that the signals are sent from base stations which signals can be heard by the first UE and the second UE, respectively. This respective group of base stations may or may not comprise the base station to which the first and the second UE is connected. The determined correlation may be a correlation value defining a value of the amount of correlation between the power measurements of the first UE and the power measurements of the second UE. The determining 206 of a correlation between the received power measurements of the first UE and the received power measurements of the second UE may be performed by comparing the power measurements of the first UE with the power measurements of the second UE so that power measurements of the respective first and second UE that derives from the same base station are compared. To compare the power measurements of the first and the second UE that derives from the same base station signifies to compare the power measured at the first UE on a signal originating from a third base station with the power measured at the second UE on a signal also originating from the third base station. The signals from the third base station may be one and the same signal. The power measurements of the first and the second UE that derives from the same base station may have been measured substantially simultaneously.

The system that performs the method may be a base station of the wireless communication network, such as the first base station 111 that receives the power measurements directly from the first UE. The first base station may then receive the measurements of the second UE via the second base station. Alternatively, the system that performs the method may be any other network node of the communication system, such as a node further away from the UE, e.g. a node in the core network or a node in the radio access network, such as another base station, a radio network controller, RNC, an MME etc. In this alternative, the first and/or second base station communicates the power measurements to the network node performing the method. Alternatively, the system that performs the method may be a group of network nodes, wherein functionality for performing the method are spread out over different physical, or virtual, nodes of the network. The latter may be called a "cloud-solution".

The received power measurements of the first UE may be associated with an ID of the first UE and the received power measurements of the second UE may be associated with an ID of the second UE so that the power measurements are associated with the correct UE in the system. The power measurements may be signal strength measurements. The power measurements may be Reference Signal Received Power, RSRP, and/or Reference Signal Received Quality, RSRQ. Base stations in the vicinity of the first/second UE may also be called neighboring base stations to the first/second UE. The information that is triggered to be sent to the first UE may be an ID of the second UE.

By such a method it can be determined whether a second UE is a neighbor to a first UE. When such a determination is performed for many, e.g. all, UEs in the vicinity of the first UE, it is possible to limit the number of UEs that a first UE should try to communicate device to device with to the number of UEs including the first UE for which it has already been determined by the network that they are a neighbor to the first UE. By such a measure it is possible for the first UE to save its battery capacity. Also, the amount of communication from the first UE to possible D2D communication possible other UEs is limited so that network resources are saved.

Figure 4:
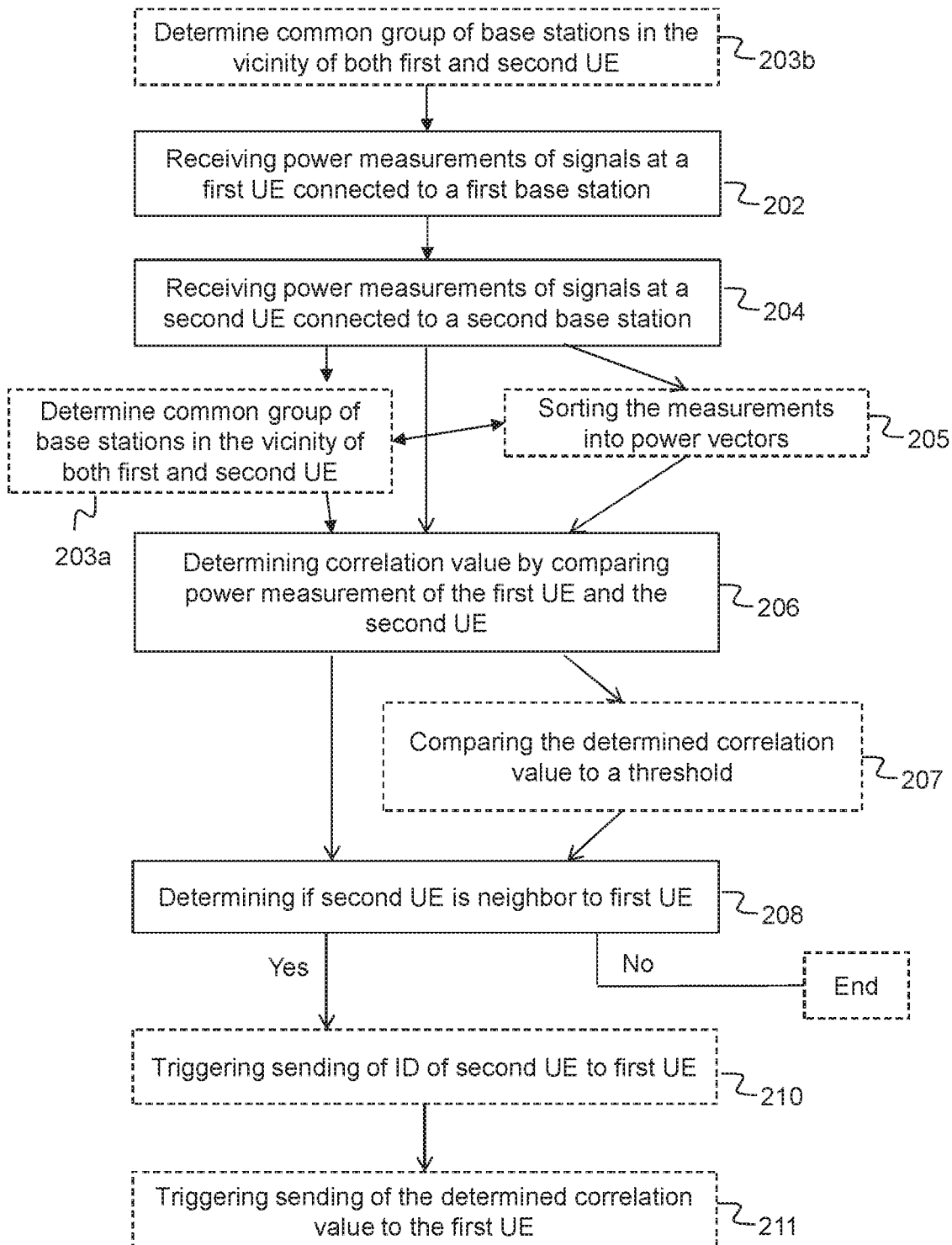
FIG. 4 is another flow chart illustrating a method in a system, according to further possible embodiments.

In FIG. 4 different embodiments of the method of FIG. 3 are described, the dashed boxes signifies an optional embodiment. The steps may not be performed in the exact same order as described in the flow chart. According to an embodiment, the method described in FIG. 3 further comprises determining 203 a common group of base stations comprising the ones of the base stations in the vicinity of the first UE and the ones of the base stations in the vicinity of the second UE that are in the vicinity of both the first UE and the second UE, and wherein the determining of correlations is performed only for the common group of base stations. The determining 203 may be performed e.g. after the power measurements have been received, box 203*a*. Thereby, the calculations can be limited to the measurements relevant only for the common group of base stations. Consequently, the calculation effort is limited considerably compared to e.g. if all neighbors to the first and second base stations are taken into account. Alternatively, the determining 203 may be performed before the power measurements have been received. In the latter case, the first and second UE may be instructed to only perform the power measurements on signals from base stations within the common group of base stations.

According to another embodiment, the common group of base stations comprises base stations that are in both a neighboring cell list of the first base station and a neighboring cell list of the second base station. The common group of base stations may be called a common cell list, CCL. In this context, a base station is controlling traffic within a cell. Consequently, there is a one-to-one relation between the base station and the cell for which reason the terminology base station and cell is interchangeable. In the case of a physical base station site comprising a plurality of sector cells each run by a part of the base station site, each part running a sector cell is to be seen as a base station.

According to another embodiment, the receiving 202 of power measurements performed on signals received at the first UE and the receiving 204 of power measurements performed on signals received at the second UE are performed only for the determined common group of base stations. By such a feature it is possible to limit the number of base station signals to scan for each UE to signals from the base stations in the common group of base stations.

According to another embodiment, the common group of base stations are determined 203 by establishing a neighborhood matrix comprising, in one column each, a plurality of base stations that are in a neighboring cell list of the first base stations or in a neighboring cell list of the second base station, and, in one row each, the first and the second base station. Further, in the first row, base stations of the plurality of base stations that are in the neighboring cell list of the first base station are marked, and in the second row, base stations of the plurality of base stations that are in the neighboring cell list of the second base station are marked. The method further comprises determining the common group of base stations between the first and the second base station by detecting the columns where there is a mark in both the first and the second row.

"A column" could as a first alternative be a vertical line in the matrix, what is normally named a column, but in a second alternative, "a column" could be a horizontal line in the matrix. In the first alternative, "a line" would be a horizontal line in the matrix and in the second alternative, "a line" would be a vertical line in the matrix. Of course such a matrix could comprise more than two base stations, i.e. more than two rows, but the concept would be the same for any number of rows. For example, if the matrix comprises 10 base stations, base stations that are in a neighboring cell list of any of the 10 base stations would have one column each, and the 10 base stations would have one row each. In the same way as for the two-line example, a mark would be made at each matrix position when that column base station is a neighbor to the row base station, and to determine a common group of base stations for a third and a fourth of the 10 different base stations, a mark should be found in both the row of the third and fourth base station. Further, "a mark" could be a "1" in the specific matrix position.

Such a matrix could be determined automatically from neighbor cell list information for a whole system. From the matrix it could then very easily be determined which base stations that are in a common cell list, for example the determining may be made automatically, by analyzing the different matrix positions.

In the following is an example illustrating the above embodiment. The common neighboring BSs of the first BS and the second BS are to be found. In a matrix, we then insert all BSs, BS3 to BS14, that are either a neighbor to the first or the second BS, so that they are assigned one column each. In a similar way, the first and the second BS are assigned one row each. In the first row, the BSs that are a neighbor to the first BS is assigned a "1" in the matrix. Similarly, in the second row, the BSs that are a neighbor to the second BS is assigned a "1" in the matrix. We will then end up with the following matrix 1 1 0 1 1 0 1 1 0 0 0 0

0 1 0 1 1 0 1 0 0 1 1 0

This matrix signifies that BS 1, which has row 1, has the following neighbors: (columns from left to right) BS3, BS4, BS6, BS7, BS9, BS10. Further, BS 2, which has row 2, has the following neighbors: BS4, BS6, BS7, BS9, BS12, and BS13. When analyzing the matrix it is easily detected which BSs that are neighbors to both BS1 and BS2 by detecting where it is a "1" in the same column in both rows. Consequently, in this example, BS4, BS6, BS7 and BS9 are in the common cell list.

In the following is another kind of matrix developed, in which the relation between a plurality of BSs, e.g. all BSs in a communication network is determined. According to this embodiment, the common group of base stations are determined by establishing a neighborhood matrix comprising in one column each, the first base station, the second base station and a plurality of further base stations in the vicinity of the first or the second UE, and, in one row each, the first base station, the second base station and the plurality of further base stations in the vicinity of the first or the second UE. Then, for each row, the base stations that are in a neighboring cell list of that row's base station are marked, e.g. with a "1". Thereafter, the common group of base stations between the first and the second base station is determined by detecting the columns where there is a mark in both the first and the second row. Also, from such a matrix other common groups of base stations can be determined, for example, the common group of base stations between BS3 and BS4 or a group of base stations common to more than two BSs, e.g. BS1, BS2 and BS3.

In the following is an example illustrating the above embodiment. In a matrix, we then insert all BSs, in this example 12 BSs, named BS1 to BS12, for which we would like to determine common cell lists. For simplicity, we may say that these 12 BSs are all BSs in a network. The first row and the first column is assigned to BS1, the second row and the second column is assigned to BS2, etc. In the first row, the BSs that are a neighbor to the BS1 is assigned a "1" in the matrix. Similarly, in the second row, the BSs that are a neighbor to BS2 is assigned a "1" in the matrix, etc. for all 10 BSs. Since one and the same BS cannot be a neighbor to itself, a diagonal from position 1,1 to position 12,12 will be assigned a "0". We will then end up with the following matrix:

0 1 0 1 1 0 1 1 0 0 0 0

1 0 0 1 1 0 1 0 0 1 1 0

0 0 0 0 1 1 0 1 1 1 0 1

1 1 0 0 0 0 0 1 1 1 0 1

1 1 1 0 0 0 1 0 1 0 1 0

```
0 0 1 0 0 0 1 1 1 0 1 1
1 1 1 0 1 1 0 0 0 1 1 1
1 0 1 1 0 1 0 0 1 1 0 0
0 0 1 1 1 1 0 1 0 1 0 1
0 1 1 1 0 0 1 1 1 0 1 1
0 1 0 0 1 1 1 0 0 1 0 0
0 0 1 1 0 1 1 0 1 1 0 0
```

This matrix signifies that BS 1, which has row 1, has the following neighbors: (columns from left to right) BS2, BS4, BS5, BS7, BS8. Further, BS 2, which has row 2, has the following neighbors: BS1, BS4, BS5, BS7, BS10, BS11. When analyzing the matrix it is easily detected which BSs that are neighbors to the same two BSs by detecting where it is a "1" in the same column in rows for both BSs. Consequently, in this example, BS4, BS5 and BS7 are in the common cell list for BS1 and BS2. As another example, BS4 and BS7 are in the common cell list for BS1 and BS12.

According to another embodiment, the method further comprises sorting 205 the received measurements into power vectors, a first power vector for the first UE comprising the power measurements of the first UE in a base station order, and a second power vector for the second UE comprising the power measurements of the second UE in the base station order. Further, the determining 206 of correlation comprises comparing the measurements of the power vector of the first UE with the measurements of the power vector of the second UE.

According to another embodiment, the correlation is determined 206 by a normalized scalar product between the power vector of the first UE and the power vector of the second UE.

According to another embodiment, the method further comprises comparing 207 the determined correlation to a correlation threshold. When the correlation is above the correlation threshold, according to the comparison, it is determined 208 that the second UE is a neighbor to the first UE.

According to another embodiment, the method further comprises, when it is determined 208 that the second UE is a neighbor to the first UE, triggering sending 210 of information to the first UE that the second UE is a neighbor to the first UE.

According to another embodiment, the method further comprises, when it is determined that the second UE is a neighbor to the first UE, triggering sending 211 the determined correlation of the second UE to the first UE.

Figure 5:
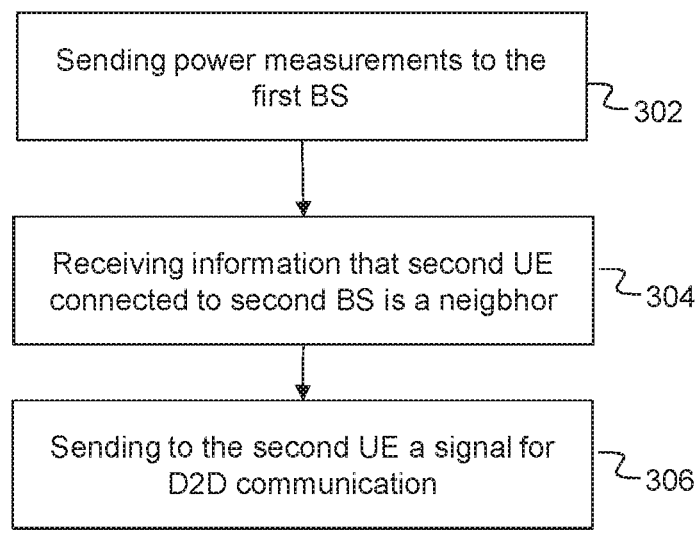
FIG. 5 is a flow chart illustrating a method in a UE, according to possible embodiments.

FIG. 5, in connection with FIG. 1, shows an embodiment of a method performed by a first UE 121 wirelessly connected to a first base station 111 of a wireless communication network 100, for detecting neighboring UEs of the first UE. The method comprises sending 302 to the first base station 111 power measurements performed on signals received from base stations 112, 113, 114, 115 in the vicinity of the first UE, each power measurement being associated with an ID of the base station from which the signal was received. The method further comprises receiving 304, from the first base station 111, information of one or more second UEs 122, 123 that is/are wirelessly connected to a different base station 112, 113, 114 than the first base station 111, information indicating that the one or more second UEs has been determined to be a neighbor to the first UE based on correlations between the power measurements of the first UE 121 and corresponding power measurements of individual of the one or more second UE 122, and sending 306 a signal to at least one of the one or more second UE, based on the received information, for device to device communication with the at least one of the one or more second UE. Such a method makes it possible for the first UE to know about other UEs in its vicinity with which it is plausible that it could talk D2D, before it has sent any signals itself trying to find any such UEs. According to an embodiment, the information of the one or more second UEs comprises identities of the one or more second UEs.

According to another embodiment, the information of the one or more second UEs indicates a priority order in which the first UE is to contact the one or more second UEs. According to another embodiment, the information indicating a priority order is the correlations between the power measurements of the first UE and the corresponding power measurements of the individual of one or more second UE.

In the following, embodiments of the invention are further described. Consider a certain region with B cells. Also, assume that each cell is a site and has a Base Station, BS, which signifies that there exists B BSs over such a region. This corresponds to a multi-cell scenario where all BSs are assumed to be connected through dedicated links for data control, as the case of X2 interface in LTE. Further, each BS knows its neighbor BSs, which are stored in a list, commonly described as Neighbor Cell List, NCL, or a monitored set. The existence of those lists, or similar lists, is essential in any cellular network to ensure service continuity during handover, or for cell-reselection procedures. Hence, all UEs in the cellular network are instructed to perform power measurements on the pilots of its serving BS and BSs in its vicinity, i.e., BSs within the NCL, and report back those values to its serving BS.

As an example, suppose that a UE served by a BS needs to perform a broadcast/multicast service request, (see 1.1 in FIG. 7) e.g., sends a message that needs to reach all UEs in the neighborhood. Also, assume that all UEs are D2D-capable and D2D communication mode is preferable over the traditional cellular mode. The serving BS will then construct and provide the list of candidate neighboring BSs to such UE so that it can more effectively evaluate the real channel conditions, e.g., through a simple beacon/acknowledge mechanism, ensuring that the list provided by the serving BS is valid and direct communication is possible.

In the following, the neighborhood matrix construction will be detailed. Step 1: Building Common Cell Lists. It is possible to build a binary matrix B that establishes the neighborhood relations between all BSs in the scenario, so that if $b_{i,j}$ is a logical 1, BSs i and j are neighbors and a logical 0 if i and j are not considered neighbors. Thus, one has $$B = \begin{pmatrix} b_{1,1} & b_{1,2} & \cdots & b_{1,B} \\ b_{2,1} & b_{2,2} & \cdots & b_{2,B} \\ \vdots & \vdots & \ddots & \vdots \\ b_{B,1} & b_{B,2} & \cdots & b_{B,B} \end{pmatrix},$$

with $$b_{i,j} = \begin{cases} 1, & \text{if } BS_i \in NCL_j \text{ and } i \neq j, \\ 0, & \text{otherwise.} \end{cases}$$

In the matrix, $BS_i$ is the i-th BS (i-th column of B) and $NCL_j$ (j-th row of B) is the set of BSs that are neighbors of $BS_j$, and i, j∈{1,2, ..., B}. Additionally, for i≠j, $BS_i \in NCL_j$ implies that $BS_j \in NCL_i$, or in other words, $b_{i,j}=b_{j,i}$.

Figure 6:
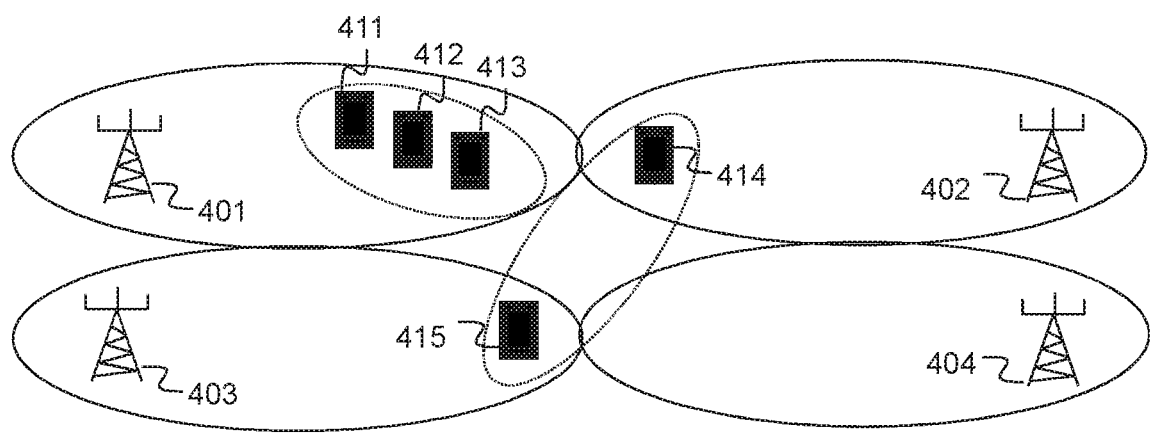
FIG. 6 is an overview of another exemplary cellular communication network showing a possible communication scenario in which the present invention may be used.

FIG. 6 shows a scenario comprising four BSs: BS1 401, BS2 402, BS3 403 and BS4 404, and five UEs: UE1 411, UE2 412 and UE3 413 situated in a first cell for connection to the BS1 401; UE4 414 situated in a second cell for connection to BS2 402 and UE5 415 situated in a third cell for connection to BS3 403. In this scenario, a matrix B can be represented as follows $$B = \begin{pmatrix} 0 & 1 & 1 & 0 \\ 1 & 0 & 0 & 1 \\ 1 & 0 & 0 & 1 \\ 0 & 1 & 1 & 0 \end{pmatrix},$$

This matrix signifies that BS2 402 and BS3 403 are neighbors to BS1 401, BS1 401 and BS4 404 are neighbors to BS2 402, BS1 401 and BS4 404 are neighbors to BS3 403 and BS2 402 and BS3 403 are neighbors to BS4 404. The UEs 412 and 413 are instructed to perform and report measurements on the neighbors of BS1, i.e. BS2 and BS3, for determining whether these UES 412 and 412 are neighbors to the UE1 411 that is within the same cell as them.

For the UE4 414 and the UE5 415 that are in a different cell than UE1 411 the following process applies for determining the Common Cell List, CCL, also called intersected neighbor cell list: The CCL is defined as the set of BSs that commonly belong to (two) different NCLs in a large geographical area. This is easy to determine using matrix B, because each row represents a different NCL. This means e.g. that BS2 402 and BS3 403 has BS1 and BS4 in their CCL. Thus, consider $NCL_j$ and $NCL_{j'}$ (j-th and j'-th rows of B) from BSs j and j', respectively. The CCL between them is given as $$CCL_{j,j'} = \begin{cases} NCL_j \cap NCL_{j'}, & \text{if } BS_{j'} \in NCL_j, \\ \emptyset, & \text{otherwise.} \end{cases}$$

Or using other words, $CCL_{j,j'}$ corresponds to the common known elements, i.e. neighbor BSs, between BSs j and j', and j'∈{1, 2, ..., B}. In this context, $B_j$ is the universe of CCLs with respect to $BS_j$, which for $BS_j \in NCL_j$, is defined as the union of all possible CCLs, i.e., $$B_j = CCL_{j,1} \cup CCL_{j,2} \cup \cdots \cup CCL_{j,j-1} \cup CCL_{j,j} \cup CCL_{j,j+1} \cup \cdots$$
$$\bigcup CCL_{j,B}$$
$$= \bigcup_{j'=1}^{B} (NCL_j \cap NCL_{j'})$$

In order to make the previous concepts more clear, consider, as another example, the next example of neighborhood matrix B:

$$B = \begin{pmatrix} 0 & 1 & 1 & 1 & 1 & 1 & 1 & 0 & 0 & 0 \\ 1 & 0 & 1 & 0 & 0 & 0 & 1 & 1 & 1 & 1 \\ \vdots & \vdots & \vdots & \vdots & \vdots & \vdots & \vdots & \vdots & \vdots & \vdots \\ 0 & 1 & 0 & 0 & 0 & 0 & 0 & 1 & 0 & 1 \\ 0 & 1 & 1 & 0 & 0 & 0 & 0 & 0 & 1 & 0 \end{pmatrix},$$

From B it is seen that the neighboring cell lists for NCLx, where X is base station nr x is: $NCL_1$={2,3,4,5,6,7}; $NCL_2$={3,7,8,9,10}; ...; $NCL_9$={2,8,10}; and $NCL_{10}$={2, 3,9}. Also, assuming a service request has occurred from a UE served by $BS_1$, the universe of CCLs $B_1$ is as follows $B_1 = CCL_{1,1} \cup CCL_{1,2} \cup \ldots \cup CCL_{1,9} \cup CCL_{1,10}$ = {2,3,4,5,6, 7}∪{3,7}∪...∪∅∪∅. In other words, $CCL_{1,2}$, the CCL for BS1 and BS2 comprises BS3 and BS7. This is seen directly from B when looking at the first two rows.

Further Details on Step 1. Each CCL has the following properties: $CCL_{j,j'}=CCL_{j',j}$; The CCL of $BS_j$ with itself is the $NCL_j$, i.e., if j'=j, $CCL_{j,j}=NCL_j$; If the $CCL_{j,j'}$ is an empty set, i.e., $CCL_{j,j'}=\emptyset$, then no common pilots exist to be scanned, therefore no neighbor UEs exist between BSs j and j'. Also, in a multicast/broadcast scenario the CCL concept can be easily extended to more than two BSs for the detection of multi-cell neighbor UEs.

Step 2: Collecting Power Measurements and Power Vectors. After the CCL has been determined the following procedure may apply: The $BS_j$ where the service request had its origin then asks the other vicinity BSs to instruct their UEs to scan the received power from the BSs within the $CCL_{j,j'}$.

Let us denote $UE_{u,j}$ as the UE u in the coverage area of BS j and, for convenience, each BS serves U UEs, i.e., u∈{1, 2, ..., U}. Therefore, the maximum number of "possible" neighbors is BU−1, i.e. all UEs in the scenario minus itself. Further, the received power of each UE with respect to each BS in the scenario may be arranged as a power matrix P, where each row represents a power vector $p_{u,j}$ of $UE_{u,j}$.

$$P = \begin{pmatrix} p_{1,1} \\ p_{2,1} \\ \vdots \\ p_{U,1} \\ p_{1,2} \\ p_{2,2} \\ \vdots \\ p_{U,2} \\ \vdots \\ p_{1,B} \\ p_{2,B} \\ \vdots \\ p_{U,B} \end{pmatrix} = \begin{pmatrix} \begin{pmatrix} p_{(1,1),1} & p_{(1,1),2} & \cdots & p_{(1,1),B} \\ p_{(2,1),1} & p_{(1,1),2} & \cdots & p_{(2,1),B} \\ \vdots & \vdots & \ddots & \vdots \\ p_{(U,1),1} & p_{(U,1),2} & \cdots & p_{(U,1),B} \end{pmatrix} \}P_1 \\ \begin{pmatrix} p_{(1,2),1} & p_{(1,2),2} & \cdots & p_{(1,2),B} \\ p_{(2,2),1} & p_{(2,2),2} & \cdots & p_{(2,2),B} \\ \vdots & \vdots & \ddots & \vdots \\ p_{(U,2),1} & p_{(U,2),2} & \cdots & p_{(U,2),B} \end{pmatrix} \}P_2 \\ \vdots \\ \begin{pmatrix} p_{(1,B),1} & p_{(1,B),2} & \cdots & p_{(1,B),B} \\ p_{(2,B),1} & p_{(2,B),2} & \cdots & p_{(2,B),B} \\ \vdots & \vdots & \ddots & \vdots \\ p_{(U,B),1} & p_{(U,B),2} & \cdots & p_{(U,B),B} \end{pmatrix} \}P_B \end{pmatrix}, \text{ and}$$

$$p_{(u,j),b} = \begin{cases} p_{(u,j),b}, & \text{if } UE_{u,j} \text{ exists and } BS_b \in CCL_{j,j'}, \\ 0, & \text{otherwise,} \end{cases}$$

where $p_{(u,j),b}$ represents the received power of $UE_{u,j}$ from $BS_b$, b∈{1, 2, ..., B} or, using other words, for UEs served by $BS_j$ or $BS_{j'}$, the received power from $BS_b$ is only considered if $BS_b$ belongs to $CCL_{j,j'}$. Moreover, $P_1, P_2, \ldots, P_B$ represent the power sub-matrices in the coverage area of $BS_1, BS_2, \ldots, BS_B$, i.e., the single-cell case.

Further Details on Step 2. As mentioned, a kind of power measurement procedure is mandatory in any cellular network because of the mobility request and cell-reselection, due to, e.g., handover reasons. Notice that the method described in this disclosure is easily extendable to other systems, such as Wireless Local Area Network, WLAN, and Worldwide Interoperability for Microwave Access, WiMAX, since most systems already dispose of methods to measure the received power, which is used e.g. during connection establishment.

In the case of LTE standards, the power measurement may be the RSRP or the RSRQ. Notice that whenever the received power for a specific BS cannot be measured by a certain UE, due to any particular reason, a standard value, e.g. zero, can be used to fill the corresponding gap in the power vector so that the matrices are still applicable. Also, both UE and cell IDs are assumed to be unique, and for LTE or LTE-Advanced networks, the ID of each UE can be obtained with a Demodulation Reference Signal, DMRS, which is sent in the uplink direction, and the cell ID with the Physical-layer Cell ID, PCI, transmitted in downlink. In order not to bias/polarize the results, the received power from the serving BS may be removed, i.e., set to zero, from the power vector of each UE because the order of magnitude of the received power is noticeable higher than the one received from vicinity BSs, with the previous formulation: if b=j'=j, then $p_{(u,j),b}=0$.

The power matrix P, as presented before, can be seen as a distributed database, in each BS, and can be used as required. For example, older values may be ignored or replaced by new measures and the exchanging of parts of P between BSs can be done in accordance with the changes since last update, therefore reducing signaling. Note that, in principle, the power matrix P is composed by sparse vectors, e.g. with lot of zeros, depending on the number of BSs to be scanned, which may be used to improve the correlation metric calculation, presented in the next section. In practice, the U UEs that are assumed in each cell is the maximum number of UEs that a BS may serve in the presented scenario, which is limited by the BS capacity.

Step 3: Building the Neighborhood Matrix. When values have been organized in the form of power vectors, a correlation metric is used to determine their correlation. Therefore, when taking two different power vectors and defining a correlation threshold $P_{TH}$, two cases may happen: Either the correlation is high, i.e., the correlation metric is above the threshold $P_{TH}$. In this situation, UEs are considered neighbors because their set of measurements is very similar and, therefore, it is likely to happen that they are in physical proximity; or the correlation is low, i.e., the correlation metric is below the threshold $P_{TH}$. In this situation, UEs are not considered as neighbors because their set of measurements is not similar and, therefore, it is likely to happen that they are far away from each other.

Thus, the next step is to calculate the, possibly normalized, cross-correlation metric between all power vectors in the scenario. A possible metric is defined as $$\rho_{x,x'} = \left\langle \frac{x}{\|x\|} \middle| \frac{x'}{\|x'\|} \right\rangle,$$

in which $\rho_{x,x'}$ is the normalized cross correlation value for power vectors $x=p_x$ and $x'=p_{x'}$, with $x=(u,j)$ and $x'=(u',j')$, i.e., the contents of two different rows of matrix P. Also, $\langle \bullet | \bullet \rangle$ is the inner product and $\|\bullet\|$ is the $l_2$ norm, defined as $$\langle x | x' \rangle = \sum_{k=1}^{K} x_k x'_k = x_1 x'_1 + x_2 x'_2 + \cdots + x_K x'_K,$$

and $$\|v\| = \sqrt{\sum_{k=1}^{K} |v_k|^2}, \text{ with } v = [v_1 \ v_2 \ \ldots \ v_K]^T, v \in \{x, x'\}, \text{ and } K = B.$$

Moreover, since $p_{u,j}$ and $p_{u',j'}$ are composed by non-negative quantities, $\rho_{(u,j),(u',j')}$ will range between 0, which means non-correlated, and 1, which means very highly correlated. As such, a threshold $P_{TH}$, between 0 and 1, may be imposed, against which different values $\rho_{(u,j),(u',j')}$ are compared.

Finally, a neighborhood matrix may be constructed and stored in each BS as follows: If $\rho_{(u,j),(u',j')}$ is above the threshold ($\rho_{(u,j),(u',j')}>P_{TH}$), $UE_{u,j}$ and $UE_{u',j'}$, i.e., UE u of BS j and UE u' of BS j', are tagged as neighbors, and $\rho_{(u,j),(u',j')}$ is placed in the corresponding $(u,j),(u',j')$ and $(u',j'),(u,j)$ indexes (note that $\rho_{(u,j),(u',j')}=\rho_{(u',j'),(u,j)}$. Else, $UE_{u,j}$ and $UE_{u',j'}$ are tagged as non-neighbors, and a 0 is placed in the corresponding $(u,j),(u',j')$ and $(u',j'),(u,j)$ indexes.

Therefore, the corresponding UE neighborhood matrix $\Omega$ looks like $$\Omega = \begin{pmatrix} w_{(1,1),(1,1)} & w_{(1,1),(2,1)} & \cdots & w_{(1,1),(U,1)} & \cdots & w_{(1,1),(1,B)} & w_{(1,1),(2,B)} & \cdots & w_{(1,1),(U,B)} \\ w_{(2,1),(1,1)} & w_{(2,1),(2,1)} & \cdots & w_{(2,1),(U,1)} & \cdots & w_{(2,1),(1,B)} & w_{(2,1),(2,B)} & \cdots & w_{(2,1),(U,B)} \\ \vdots & \vdots & \ddots & \vdots & \cdots & \vdots & \vdots & \ddots & \vdots \\ w_{(U,1),(1,1)} & w_{(U,1),(2,1)} & \cdots & w_{(U,1),(U,1)} & \cdots & w_{(U,1),(1,B)} & w_{(U,1),(2,B)} & \cdots & w_{(U,1),(U,B)} \\ \vdots & \vdots & \ddots & \vdots & \ddots & \vdots & \vdots & \ddots & \vdots \\ w_{(1,B),(1,1)} & w_{(1,B),(2,1)} & \cdots & w_{(1,B),(U,1)} & \cdots & w_{(1,B),(1,B)} & w_{(1,B),(2,B)} & \cdots & w_{(1,B),(U,B)} \\ w_{(2,B),(1,1)} & w_{(2,B),(2,1)} & \cdots & w_{(2,B),(U,1)} & \cdots & w_{(2,B),(1,B)} & w_{(2,B),(2,B)} & \cdots & w_{(2,B),(U,B)} \\ \vdots & \vdots & \ddots & \vdots & \ddots & \vdots & \vdots & \ddots & \vdots \\ w_{(U,B),(1,1)} & w_{(U,B),(2,1)} & \cdots & w_{(U,B),(U,1)} & \cdots & w_{(U,B),(1,B)} & w_{(U,B),(2,B)} & \cdots & w_{(U,B),(U,B)} \end{pmatrix},$$

with $$w_{(u,j),(u',j')} = \begin{cases} \rho_{(u,j),(u',j')}, & \text{if } (u, j) \neq (u', j') \text{ and } \rho_{(u,j),(u',j')} > P_{TH}, \\ 0, & \text{otherwise.} \end{cases}$$

Note that, the square matrix $\Omega$ is symmetric, i.e., values in (u,j),(u',j') and (u',j'),(u,j) are equal and, in principle, sparse, i.e. with lots of zeros, thus only values different from zero in the lower or upper triangles may be used, e.g. for saving storage space. These properties are clearly shown next, where n can be rewritten as $$\Omega = \begin{pmatrix} \Omega_{1,1} & \Omega_{1,2} & \cdots & \Omega_{1,B} \\ \Omega_{2,1} & \Omega_{2,2} & \cdots & \Omega_{2,B} \\ \vdots & \vdots & \ddots & \vdots \\ \Omega_{B,1} & \Omega_{B,2} & \cdots & \Omega_{B,B} \end{pmatrix},$$

where, e.g., $\Omega_{1,1}$ and $\Omega_{1,B} = \Omega_{B,1}^T$ look like $$\Omega_{1,1} = \begin{pmatrix} w_{(1,1),(1,1)} & w_{(1,1),(2,1)} & \cdots & w_{(1,1),(U,1)} \\ w_{(2,1),(1,1)} & w_{(2,1),(2,1)} & \cdots & w_{(2,1),(U,1)} \\ \vdots & \vdots & \ddots & \vdots \\ w_{(U,1),(1,1)} & w_{(U,1),(2,1)} & \cdots & w_{(U,1),(U,1)} \end{pmatrix};$$

$$\Omega_{1,B} = \begin{pmatrix} w_{(1,1),(1,B)} & w_{(1,1),(2,B)} & \cdots & w_{(1,1),(U,B)} \\ w_{(2,1),(1,B)} & w_{(2,1),(2,B)} & \cdots & w_{(2,1),(U,B)} \\ \vdots & \vdots & \ddots & \vdots \\ w_{(U,1),(1,B)} & w_{(U,1),(2,B)} & \cdots & w_{(U,1),(U,B)} \end{pmatrix};$$

$$\Omega_{B,1} = \begin{pmatrix} w_{(1,B),(1,1)} & w_{(1,B),(2,1)} & \cdots & w_{(1,B),(U,1)} \\ w_{(2,B),(1,1)} & w_{(2,B),(2,1)} & \cdots & w_{(2,B),(U,1)} \\ \vdots & \vdots & \ddots & \vdots \\ w_{(U,B),(1,1)} & w_{(U,B),(2,1)} & \cdots & w_{(U,B),(U,1)} \end{pmatrix}.$$

Generally speaking, sub-matrix $\Omega_{j,j'} = \Omega_{j',j}^T$ translates the neighborhood relation between UEs served by $BS_j$ and $BS_{j'}$. Additionally, j'=j represents the single-cell case.

Further Details of Step 3. The proposed normalized cross correlation metric expressed as the normalized inner product between two power vectors is one possible correlation metric, but other correlation metrics may be used, that can be easily found in literature. An example of such other correlation metric is the Pearson product-moment correlation coefficient or the metrics stated in section 9.6 of the book: S. R. Saunders and A. A. Zavala, Antennas and Propagation for Wireless Communication Systems, 2nd ed. John Wiley & Sons, Ltd., 2007, isbn: 978-0-470-84879-1 (e.g., Pearson's correlation coefficient). Similarly, instead of storing the real correlation value in the UE neighborhood matrix $\Omega$, "1" may be stored whenever $\rho_{(u,j),(u',j')} > P_{TH}$ and so obtain a binary matrix $\Omega$. However, by storing the real values, they can be used to sort the list of candidate neighbors of a UE, e.g. highest correlation first, and that information may be used to improve routing protocols in multicast or broadcast scenarios.

Additionally, instead of setting the value to zero when the power measure is unavailable, other reference value might be used, such as the maximum long-term fading value towards the first ring of interfering cells. Furthermore, this value can be controlled in a way that it limits the number of false neighbors and maximizes the number of real neighbors. Moreover, instead of using local indexes for UEs, a function, which e.g. uses BSs indexes, may be defined for translating/mapping local UE indexes into global ones, making the notation of n simpler.

Step 4. Store and Exchange the UE Neighborhood Matrix. Next, the built UE neighborhood matrix is stored at the BS and the corresponding row or the full matrix is delivered to UEs upon request.

Thereafter, to make sure that two or more D2D-capable UEs are real neighbors, i.e. to validate the information provided by the serving BS through the neighborhood matrix, the D2D channel should preferably be evaluated before commencing a D2D communication. Basically, it may be necessary to ensure that a D2D link can effectively be established, which can be done by a single pair of beacon/acknowledgement packets.

Further Comments on Scanning Universe and Time Basis. As said before, conventionally, UEs are instructed to perform measurements within the NCL of their serving BS. In the formulation above, this concept is taken further and UEs may in principle measure the received power from all B BSs within the considered scenario, or at least in $B = B_1 \cup B_2 \cup \ldots \cup B_B$ (note that card$\{B\} \leq B$ i.e., the number of elements in B is less or equal to B). However, a full scanning in the whole universe that is time consuming and can completely drain UE's battery may not be required depending on the type of service request. In fact, it may be restricted to $B_j$ (of $BS_j$) or even just few of its CCLs.

Figure 7:
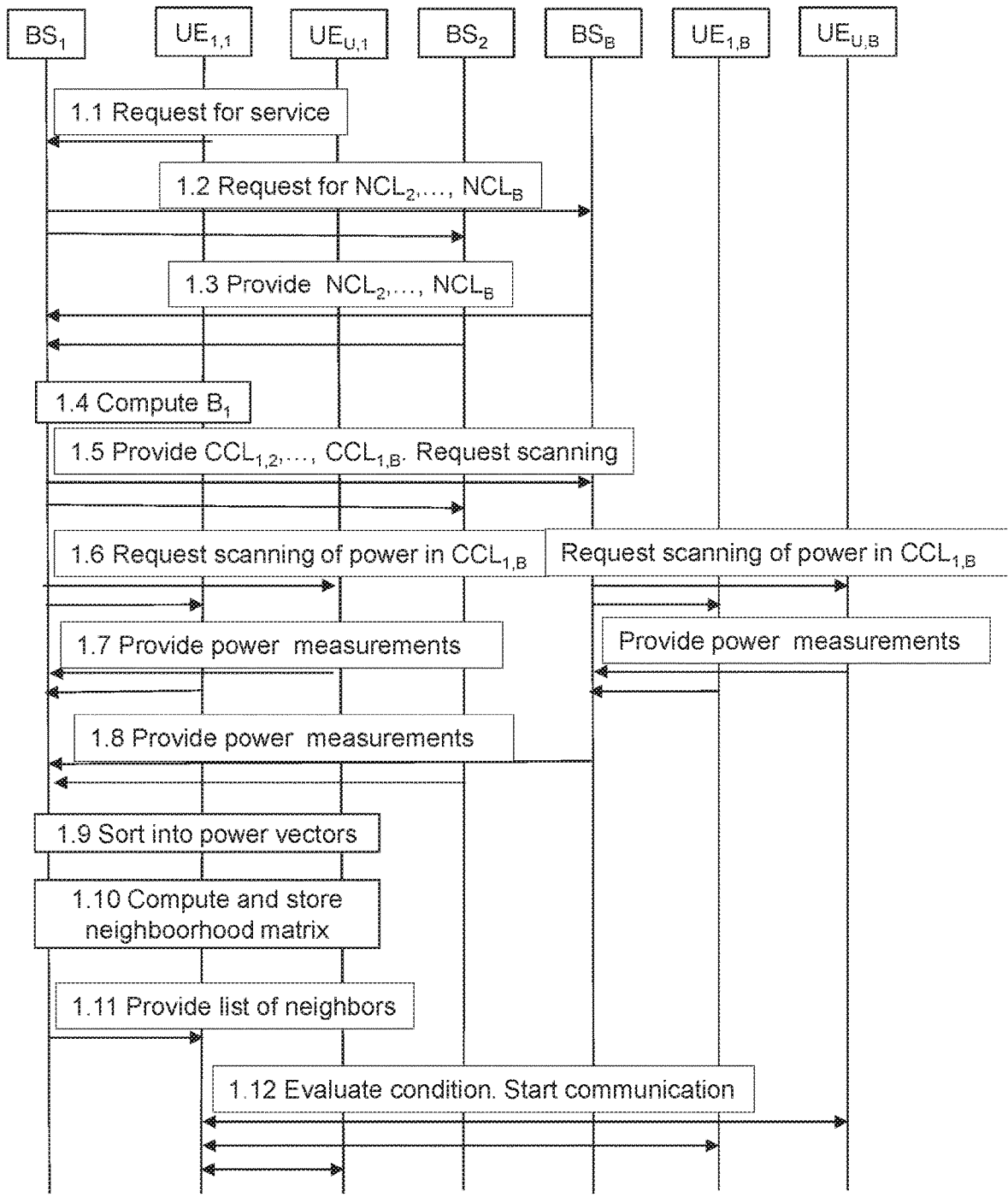
FIG. 7 is a signaling diagram illustrating an example of a procedure, according to further possible embodiments.

FIG. 7 describes a message flowchart between D2D-capable UEs and BSs. At 1.1, a first UE, $UE_{1,1}$ sends a service request, for e.g. a broadcast service, where it needs to send a message that is to reach many or all its neighboring UEs that are D2D-capable, to its serving BS, the first BS, $BS_1$. This request triggers $BS_1$ to request 1.2 the NCLs of other BSs, $BS_2, \ldots, BS_B$, in the vicinity of $BS_1$. In response, the $BS_2, \ldots, BS_B$ provides 1.3 their respective NCL to the $BS_1$. Thereafter, $BS_1$ computes 1.4 its neighborhood matrix $B_1$, and from $B_1$ calculates the $CCL_{1,2}, \ldots, CCL_{1,B}$, i.e. the CCLs for each BS in union with $BS_1$. The CCLs are then provided 1.5 to the respective BS and the respective BS is requested to instruct their UEs to scan, i.e. measure, the received power from the BSs within the CCL. In 1.6, the respective BS, $BS_2, \ldots, BS_B$, as well as $BS_1$ requests their UEs to do the scanning. As a result, the UEs, $UE_{1,1}, \ldots, UE_{1,B}$ as well as $UE_{1,B}, \ldots, UE_{U,B}$ provide 1.7 the power measurements to their serving BS, $BS_1$ and $BS_2, \ldots, BS_B$ and the BSs $BS_2, \ldots, BS_B$ provide 1.8 their UE's power measurements further to the first base station $BS_1$ $BS_1$ then sorts 1.9 the power measurements into power vectors and computes 1.10 the UE neighborhood matrix $\Omega$ defining which UEs that are neighbors. The list of neighboring UEs is then provided 1.11 to the first UE, $UE_{1,1}$. The first UE then evaluates 1.12 the actual possibility to communicate with the defined neighboring UEs, by e.g. sending a message and waiting for an acknowledgement from the respective UE. Here $UE_{U,1}$ represents a UE within the same cell as $UE_1$, and $UE_{1,B}, \ldots, UE_{U,B}$ represents UEs in other neighboring cells.

Possible execution times for the different phases may be as follows: phases 1.2 to 1.8 can be done at every 200 ms to 1 s, or 200 to 1000 Transmission Time Intervals, TTIs. Phases 1.9 to 1.12 can be done at each new service request or whenever the UE is scheduled.

Figure 8:
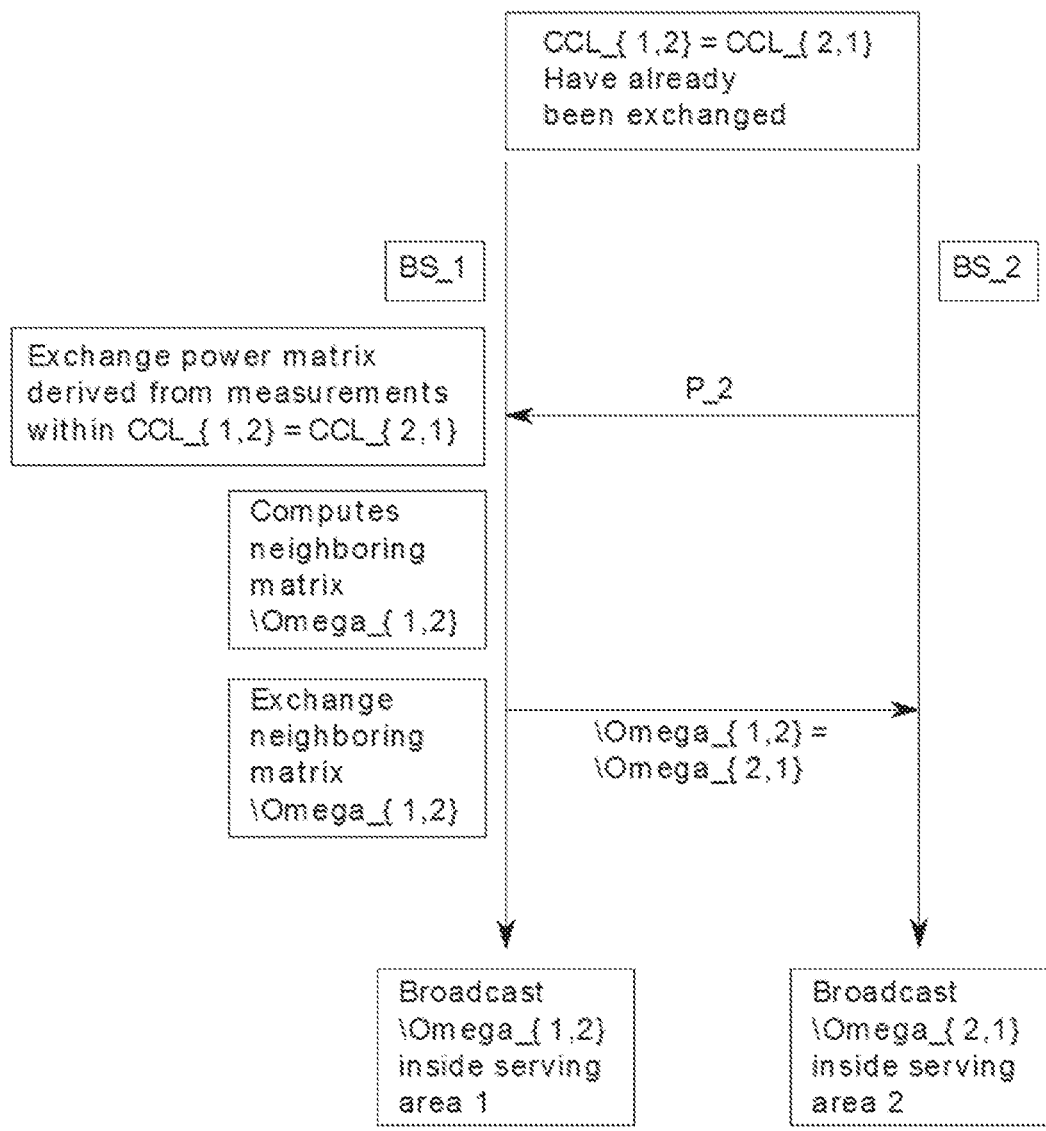
FIGS. 8-9 are other signaling diagrams illustrating examples of a procedure according to further possible embodiments.

FIG. 8 shows an embodiment for processing the UE neighborhood matrix $\Omega$ among a first BS, BS_1 and a second BS, BS_2. This embodiment describes a centralized processing, which is similar to the process described in FIG. 7. In this embodiment, the common cell list, CCL $\{1,2\}$ that defines which neighboring BSs are neighbors to both BS_1 and BS_2, has already been exchanged between BS_1 and BS_2. As already explained, CCL $\{1,2\}$=CCL $\{2,1\}$. Thereafter, BS_1 and BS_2 instructs its UEs to perform measurements on signals from the neighboring BSs in the CCL, receives the power measurements from its respective UEs and creates power matrices P for the power measurements they have respectively receives. Then the power matrix P_2 that BS_2 has created is sent to BS_1. From the power matrices from BS_1, P_1, and from BS_2, P_2, BS_1 computes a UE neighborhood matrix $\Omega\{1,2\}$ that defines correlation values between UEs in cell1 and cell2. The UE neighborhood matrix $\Omega\{1,2\}$ (called "neighboring matrix" in FIG. 8) is then sent to BS_2. BS_1 and BS_2 then broadcast the UE neighborhood matrix to the UEs inside its respective cell, at least to the D2D-enabled UEs.

Figure 9:
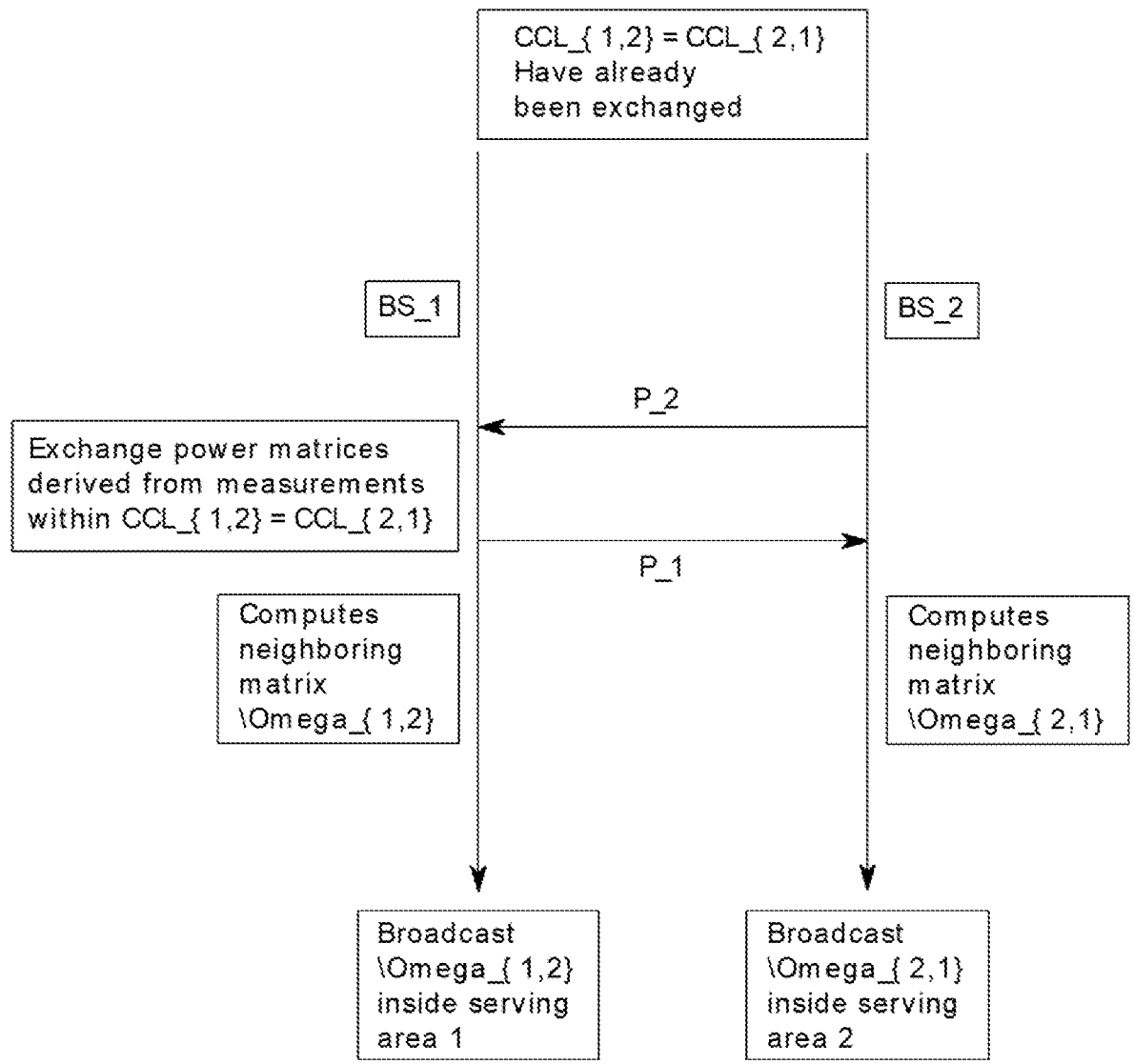

FIG. 9 is similar to FIG. 8. However, here the processing of $\Omega$ is distributed between BS_1 and BS_2 whereas in FIG. 8 the processing of $\Omega$ was centralized to BS_1. The difference between FIG. 8 and FIG. 9 is that BS_1 sends its power matrix P_1 to BS_2 that based on P_1 and its own power matrix P_2 computes the UE neighboring matrix $\Omega\{2,1\}$, which it broadcasts to the UEs inside its cell. In a similar way, BS_2 sends its power matrix P_2 to BS_1 that based on P_1 and P_2 computes the UE neighboring matrix $\Omega\{1,2\}$ and distributes it to the UEs inside its cell. In the latter two equal computations are performed since $\Omega\{1,2\}=\Omega\{2,1\}$.

Embodiments of the described invention is able to operate in Frequency Division Duplex, FDD, full duplex, and/or Time Division Duplex, TDD, modes and is not dependent on the radio access technology.

Further, given that a set of UE neighborhood matrices has been built at the BSs, the number of UE candidate neighbors can become known to each UE and, therefore, the time to discover a neighboring UE that the UE can communicate D2D with is just the time to evaluate the real channel conditions for the D2D links of the candidate neighbors. Further, the stopping criteria, i.e., the criteria that sets when the UE neighbor discovery process shall stop, can be better defined/adjusted.

A further possible advantage is that the UE power that is consumed in the discovery process is lower than without the above embodiments because the main work for discovering neighboring UEs is done at the BS, building the neighborhood relations, which for each UE is considered to be a small set. Thus, just before the session establishment, the cluster-head UE just needs to ensure that D2D communication can be established through the UE-UE channel, which can be done, e.g., by a single pair of beacon/acknowledgement packets.

A further advantage is that no new protocol is required to be implemented for the measurement process because signal quality measurements are already available/exchanged in the network and are already mandatory for the network to operate. Also, BSs are connected though a dedicated link for data control, so no new link is required. However, three new types of messages may be required: for exchanging the NCL lists between BSs; for the range of BSs to be scanned; and for each BS to inform the neighbor candidate list to each UE.

Embodiments of the present invention solves the hidden UE problem. Building the neighborhood matrix is a centralized process and since the BS is aware of any UE-UE direct communication that is ongoing, if any candidate neighbor is potentially seen as "hidden", it may just be removed from the UE neighborhood matrix, therefore avoiding the problem.

The use of network-related security features mitigates possible fake node attacks. The network-added neighbor discovery process is less prone for such an attack to succeed since each D2D-capable UE needs to register itself in the network. If any misbehaving action is detected, its ID will be stored in a blacklist and prevented to operate;

Embodiments of the present invention also have the following advantages: UEs that belong to different cells, i.e. UEs served by different BSs, are able to discover each other, which enables cross-cell border D2D communications; The NCL of each BS may be especially large, e.g., in crowded areas where the deployment is based on small cells. With the introduction of CCL concept, the number of BSs to be scanned for each UE is limited, which reduces the power wasted in the scanning, therefore improving the UE's batteries lifetime.

Figure 10:
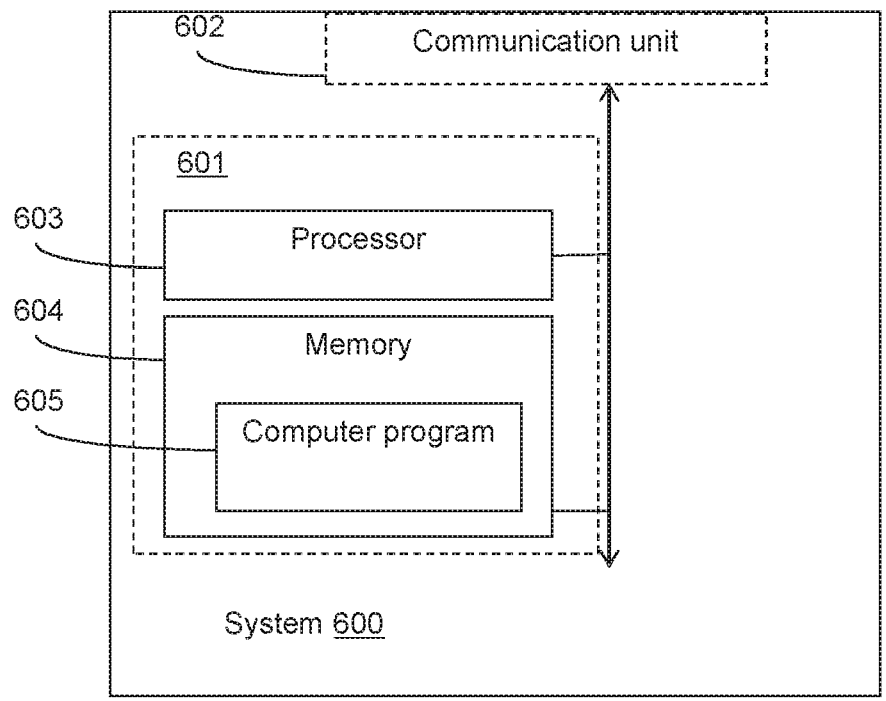
FIGS. 10-11 are schematic block diagrams of a system according to possible embodiments.

FIG. 10, in connection with FIG. 1, describes an embodiment of a system 600 operable in a wireless communication network 100 configured for detecting neighboring UEs of a first UE 121 that is wirelessly connected to a first base station 111 of the network. The system 600 comprising a processor 603 and a memory 604. The memory 604 contains instructions executable by said processor, whereby the system 600 is operative for receiving power measurements performed on signals received at the first UE, which signals are sent from base stations in the vicinity of the first UE, each received power measurement being associated with an ID of the base station from which the signal was sent, and receiving power measurements of signals received at a second UE that is wirelessly connected to a second base station of the network, different from the first base station, which signals are sent from base stations in the vicinity of the second UE, each power measurement being associated with an ID of the base station from which the signal was sent. The system is further operative for determining a correlation between the received power measurements of the first UE and the received power measurements of the second UE, and based on the determined correlation, determining whether the second UE is a neighbor to the first UE.

The system 600 may be a base station of the wireless communication network, such as the first base station 111. Alternatively, the system may be any other network node of the communication system, such as a node further away from the UE, e.g. a node in the core network or a node in the radio access network, such as another base station, a radio network controller, RNC, an MME etc. In this alternative, the first and/or second base station is arranged to communicate the power measurements to the system 600. Alternatively, the system 600 may be a group of network nodes, wherein the functionality of the system is spread out over different physical, or virtual, nodes of the network. The latter may be called a "cloud-solution".

According to an embodiment, the system is further operative for determining a common group of base stations comprising the ones of the base stations in the vicinity of the first UE and the ones of the base stations in the vicinity of the second UE that are in the vicinity of both the first UE and the second UE. The determining of correlations is then performed only for the common group of base stations. The common group of base stations may comprise base stations that are in both a neighboring cell list of the first base station and a neighboring cell list of the second base station.

According to an embodiment, the system is operative for the receiving of power measurements performed on signals received at the first UE and for the receiving of the power measurements performed on signals received at the second UE only for the determined common group of base stations.

According to an embodiment, the system is operative for determining the common group of base stations by establishing a base station neighborhood matrix B comprising, in one column each, a plurality of base stations that are in a neighboring cell list of the first base station or in a neighboring cell list of the second base station, and, in one row each, the first and the second base station, in which in the first row, base stations of the plurality of base stations that are in the neighboring cell list of the first base station are marked, and in the second row, base stations of the plurality of base stations that are in the neighboring cell list of the second base station are marked, and determining the common group of base stations between the first and the second base station by detecting the columns where there is a mark in both the first and the second row.

According to an embodiment, the system is operative for determining the common group of base stations by establishing a base station neighborhood matrix B comprising in one column each, the first base station, the second base station and a plurality of further base stations in the vicinity of the first or the second UE, and, in one row each, the first base station, the second base station and the plurality of further base stations in the vicinity of the first or the second UE, and for each row, marking the base stations that are in a neighboring cell list of that row's base station, and determining the common group of base stations between the first and the second base station by detecting the columns where there is a mark in both the first and the second row.

According to another embodiment, the system is further operative for sorting the received measurements into power vectors, a first power vector for the first UE comprising the power measurements of the first UE in a base station order, and a second power vector for the second UE comprising the power measurements of the second UE in the base station order, and wherein the system being operative for determining of correlation comprises the system being operative for comparing the measurements of the power vector of the first UE with the measurements of the power vector of the second UE.

According to another embodiment, the system is further operative for determining the correlation by a normalized scalar product between the power vector of the first UE and the power vector of the second UE.

According to another embodiment, the system is further operative for comparing the determined correlation to a correlation threshold, and wherein the system is operative for determining that the second UE is a neighbor to the first UE when the correlation is above the correlation threshold.

According to another embodiment, the system is further operative for triggering sending of information to the first UE that the second UE is a neighbor to the first UE, when it has been determined that the second UE is a neighbor to the first UE.

According to another embodiment, the system is further operative for triggering sending the determined correlation of the second UE to the first UE, when it has been determined that the second UE is a neighbor to the first UE.

According to other embodiments, the system 600 may further comprise a communication unit 602, which may be considered to comprise conventional means for communicating from and/or to other nodes in the network 100, such as the first and second base stations, UEs etc. The communication unit 602 may comprise one or more communication ports for communicating with the other nodes in the network, or, in case the system is a base station, transceivers for transmitting and receiving wireless signals from/to UEs. The instructions executable by said processor 603 may be arranged as a computer program 605 stored in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above.

Figure 11:
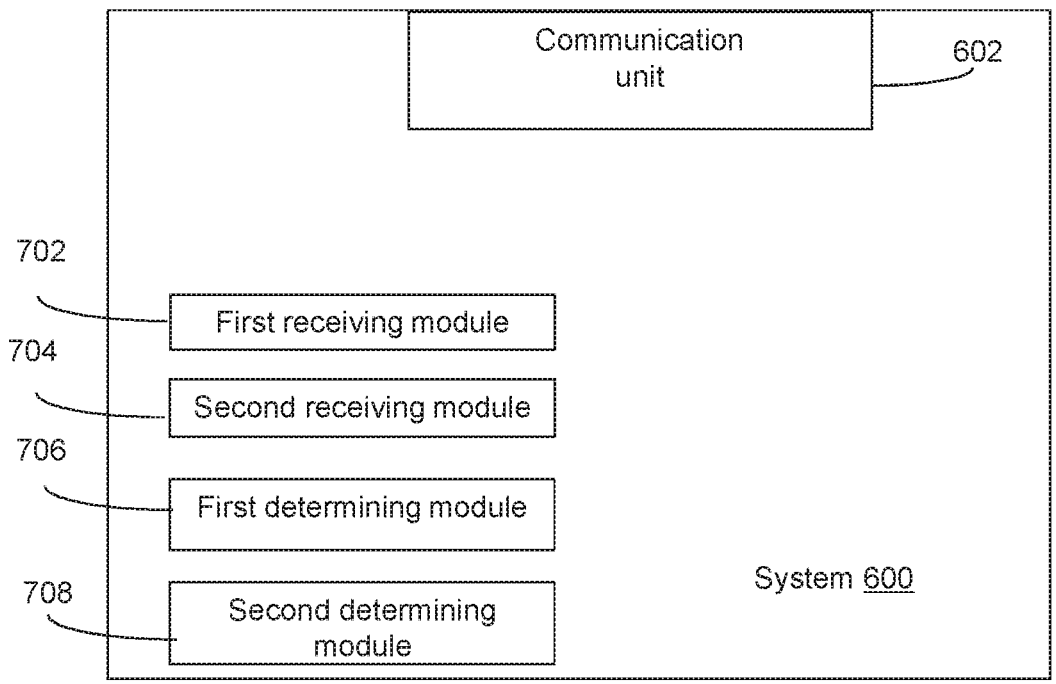

FIG. 11 describes another embodiment of a system 600 operable in a wireless communication network 100 configured for detecting neighboring UEs of a first UE 121 that is wirelessly connected to a first base station 111 of the network. The system 600 comprises a first receiving module 702 for receiving power measurements performed on signals received at the first UE, which signals are sent from base stations in the vicinity of the first UE, each received power measurement being associated with an ID of the base station from which the signal was sent, and a second receiving module 704 for receiving power measurements of signals received at a second UE that is wirelessly connected to a second base station of the network, different from the first base station, which signals are sent from base stations in the vicinity of the second UE, each power measurement being associated with an ID of the base station from which the signal was sent. The system 600 further comprises a first determining module 706 for determining a correlation between the received power measurements of the first UE and the received power measurements of the second UE, and a second determining module 708 for determining whether the second UE is a neighbor to the first UE, based on the determined correlation. The system 600 may further comprise a communication unit 602 similar to the communication unit of FIG. 10.

Figure 12:
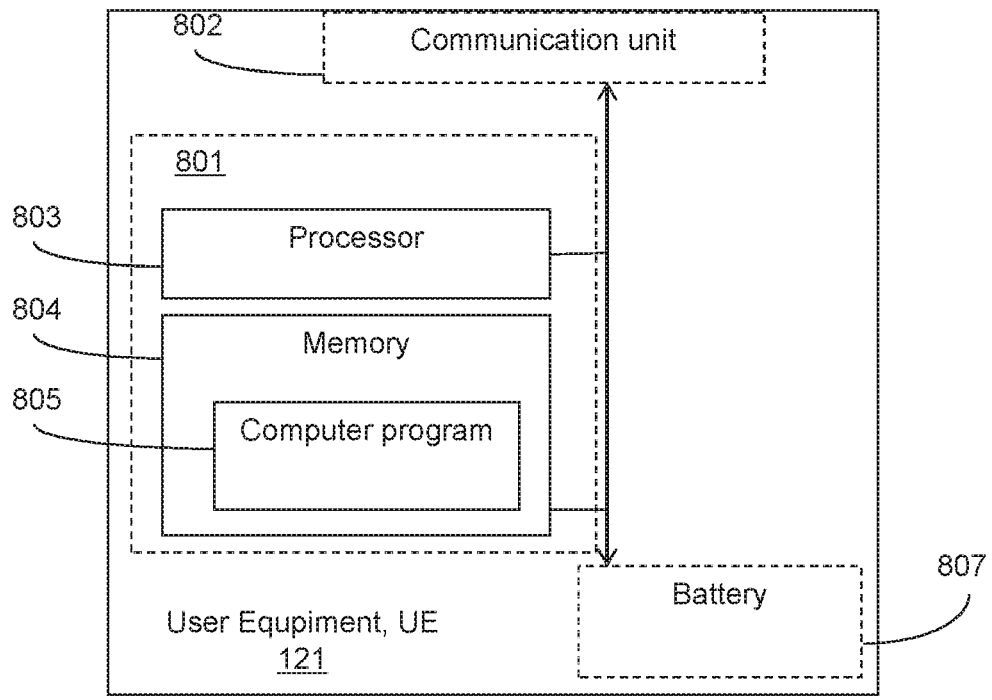
FIGS. 12-13 are schematic block diagrams of a UE according to possible embodiments.

FIG. 12 shows a first UE 121 configured to be wirelessly connected to a first base station 111 of a wireless communication network 100, the first UE being operable for detecting neighboring UEs of the first UE. The first UE 121 comprises a processor 803 and a memory 804. The memory contains instructions executable by said processor, whereby the first UE 121 is operative for sending to the first base station 111 power measurements performed on signals received from base stations 112, 113, 114, 115 in the vicinity of the first UE, each power measurement being associated with an ID of the base station from which the signal was received. The first UE 121 is further operative for receiving, from the first base station 111 information of one or more second UEs 122, 123 that is/are wirelessly connected to a different base station 112, 113, 114 than the first base station 111, information indicating that the one or more second UEs has been determined to be a neighbor to the first UE based on correlations between the power measurements of the first UE 121 and corresponding power measurements of individual of the one or more second UE 122, and sending a signal to at least one of the one or more second UE, based on the received information, for device to device communication with the at least one of the one or more second UE.

According to an embodiment, the information of the one or more second UEs indicates a priority order in which the first UE is to contact the one or more second UEs. The information indicating a priority order is the correlations between the power measurements of the first UE and the corresponding power measurements of the individual of one or more second UE.

According to other embodiments, the first UE 121 may further comprise a communication unit 802, which may be considered to comprise conventional means for communicating from and/or to other nodes in the network 100, such as the first and second base stations and other UEs. The communication unit 802 may comprise one or more transceivers for transmitting and receiving wireless signals to/from the base stations and D2D to/from other UEs. The instructions executable by said processor 803 may be arranged as a computer program 805 stored in said memory 804. The processor 803 and the memory 804 may be arranged in a sub-arrangement 801. The sub-arrangement

801 may be a micro-processor and adequate software and storage therefore, a Programmable Logic Device, PLD, or other electronic component(s)/processing circuit(s) configured to perform the actions and/or methods mentioned above. The first UE may further comprise a power supply such as a battery 807 for supplying the first UE with electrical power.

Figure 13:
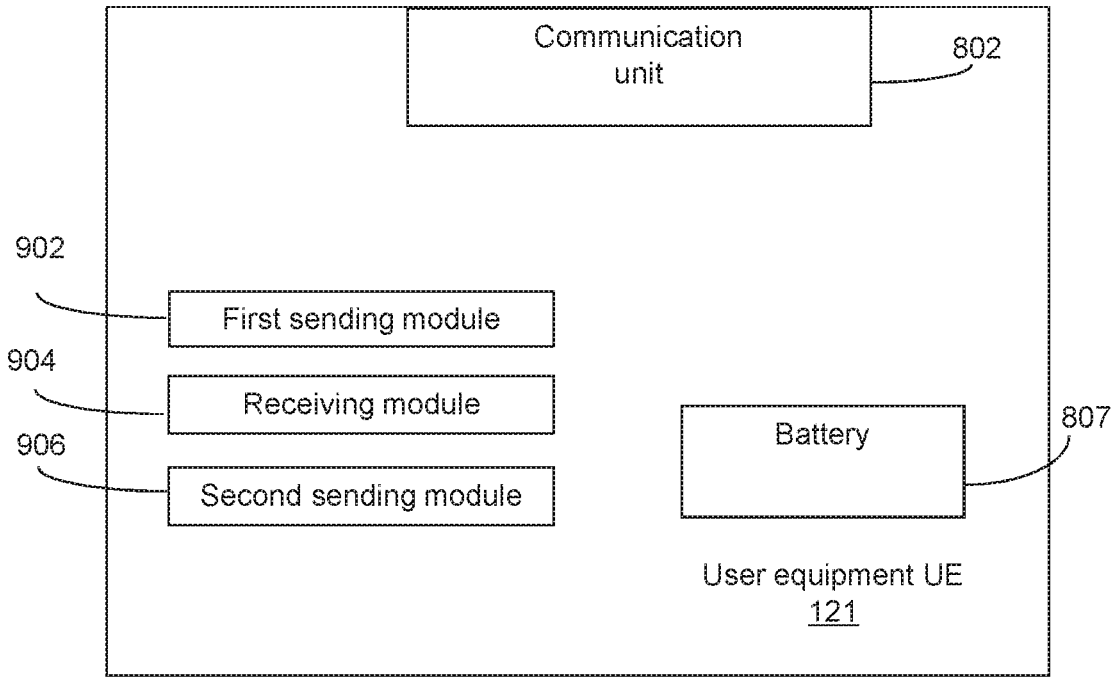

FIG. 13, in connection with FIG. 1, shows an embodiment of a first UE 121 configured to be wirelessly connected to a first base station 111 of a wireless communication network 100, the first UE being operable for detecting neighboring UEs of the first UE. The first UE 121 comprises a first sending module 902 for sending to the first base station 111 power measurements performed on signals received from base stations 112, 113, 114, 115 in the vicinity of the first UE, each power measurement being associated with an ID of the base station from which the signal was received. The first UE further comprises a receiving module 904 for receiving, from the first base station 111 information of one or more second UEs 122, 123 that is/are wirelessly connected to a different base station 112, 113, 114 than the first base station 111, information indicating that the one or more second UEs has been determined to be a neighbor to the first UE based on correlations between the power measurements of the first UE 121 and corresponding power measurements of individual of the one or more second UE 122, and a second sending module 906 for sending a signal to at least one of the one or more second UE, based on the received information, for device to device communication with the at least one of the one or more second UE. The first UE 121 may further comprise a communication unit 802 and a battery 807 similar to the communication unit of FIG. 12.

The computer programs 605 and 805 may respectively comprise computer readable code means, which when run in the system/the first UE causes the system/the first UE to perform the steps described in any of the described embodiments of the respective system/first UE. The computer program 605; 805 may be carried by a computer program product connectable to the processor 603; 803. The computer program product may be the memory 604; 804. The memory 604; 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604; 804. Alternatively, the computer program may be stored on a server or any other entity connected to the communication network to which the system/first UE has access via the communication unit 602; 802 of the respective system and first UE. The computer program may then be downloaded from the server into the memory 604; 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a system network node of a wireless communication network, for detecting neighboring User Equipments, UEs, of a first UE that is wirelessly connected to a first base station of the wireless communication network, the method comprising:

determining a common group of base stations comprising a plurality of base stations that are in a vicinity of both the first UE and a second UE, each base station of the plurality of base stations being in both a neighboring cell list of the first UE and in a neighboring cell list of the second UE, wherein the second UE is wirelessly connected to a second base station of the wireless communication network, the second base station different from the first base station, receiving power measurements performed on signals received at the first UE, which signals are sent from base stations in the common group of base stations, each power measurement of a signal received at the first UE being associated with an ID of a base station from which the signal was sent, receiving power measurements of signals received at the second UE, which signals are sent from base stations in the common group of base stations, each power measurement of a signal received at the second UE being associated with an ID of a base station from which the signal was sent, determining, for the common group of base stations, a correlation between the power measurements of the first UE and the power measurements of the second UE, based on the correlation determined, determining whether the second UE is a neighbor to the first UE; and performing an action responsive to determining that the second UE is a neighbor to the first UE.

2. The method according to claim 1, wherein the determining of the correlation is performed only for the common group of base stations.

3. The method according to claim 1, wherein the power measurements received of signals received at the first UE and the power measurements received of signals received at the second UE are only power measurements for the common group of base stations.

4. The method according to claim 1, wherein the common group of base stations are determined by establishing a base station neighborhood matrix B comprising, in one column each, a plurality of base stations that are in a neighboring cell list of the first base station or in a neighboring cell list of the second base station, and, in one row each, the first base station and the second base station, in which in a first row, base stations of the plurality of base stations that are in the neighboring cell list of the first base station are marked, and in a second row, base stations of the plurality of base stations that are in the neighboring cell list of the second base station are marked, and determining the common group of base stations between the first base station and the second base station by detecting the columns where there is a mark in both the first row and the second row.

5. The method according to claim 1, wherein the common group of base stations are determined by establishing a base station neighborhood matrix B comprising in one column each, the first base station, the second base station and a plurality of further base stations in the vicinity of the first UE or the second UE, and, in one row each, the first base station in a first row, the second base station in a second row, and the plurality of further base stations in the vicinity of the first UE or the second UE in other rows, and for each row, marking the base stations that are in a neighboring cell list of that row's base station, and determining the common group of base stations between the first base station and the second base station by detecting the columns where there is a mark in both the first row and the second row.

6. The method according to claim 1, further comprising:
sorting the power measurements into power vectors, a first power vector for the first UE comprising power measurements of the first UE in a base station order, and a second power vector for the second UE comprising power measurements of the second UE in the base station order,
and wherein the determining of the correlation comprises comparing the first power vector of the first UE with the second power vector of the second UE.

7. The method according to claim 6, wherein the correlation is determined by a normalized scalar product between the first power vector for the first UE and the second power vector for the second UE.

8. The method according to claim 1, further comprising:
comparing the correlation determined to a correlation threshold, and wherein it is determined that the second UE is a neighbor to the first UE when the correlation determined is above the correlation threshold.

9. The method according to claim 1, further comprising, when it is determined that the second UE is a neighbor to the first UE, triggering sending of information to the first UE that the second UE is a neighbor to the first UE.

10. The method according to claim 1, further comprising:
when it is determined that the second UE is a neighbor to the first UE, triggering sending the correlation determined of the second UE to the first UE.

11. A method performed by a first User Equipment, UE, wirelessly connected to a first base station of a wireless communication network, for detecting neighboring UEs of the first UE, the method comprising:
sending, to the first base station, power measurements performed on signals received from base stations in a vicinity of the first UE and which are in a neighboring cell list of the first UE, each power measurement of a signal received being associated with an ID of a base station from which the signal was received;
receiving, from the first base station, information of one or more second UEs that are wirelessly connected to a different base station than the first base station, information indicating that the one or more second UEs have been determined to be a neighbor to the first UE based on correlations between the power measurements of the first UE and corresponding power measurements of individual second UEs of the one or more second UEs, wherein the information of the one or more second UEs indicates a priority order in which the first UE is to contact the one or more second UEs that is based on correlations between the power measurements of the first UE and corresponding power measurements of individual second UEs of the one or more second UEs, and
sending a signal to at least one of the one or more second UEs, based on the information received, for device to device communication with the at least one of the one or more second UEs, and responsive to receiving an acknowledgement of the signal; establishing device to device communication with the at least one of the one or more second UEs.

12. A system network node operable in a wireless communication network configured for detecting neighboring UEs of a first UE that is wirelessly connected to a first base station of the wireless communication network, the system network node comprising a processor and a memory, said memory containing instructions, which when executed by said processor, causes the system network node to perform operations comprising:
determining a common group of base stations comprising a plurality of base stations that are in a vicinity of both the first UE and a second UE, each base station of the plurality of base stations being in both a neighboring cell list of the first UE and in a neighboring cell list of the second UE, wherein the second UE is wirelessly connected to a second base station of the wireless communication network, the second base station different from the first base station,
receiving power measurements performed on signals received at the first UE, which signals are sent from base stations in the common group of base stations, each power measurement of a signal received at the first UE being associated with an ID of the base station from which the signal was sent,
receiving power measurements of signals received at a second UE, which signals are sent from base stations in the common group of base stations, each power measurement of a signal received at the second UE being associated with an ID of the base station from which the signal was sent,
determining, for the common group of base stations, a correlation between the power measurements received of the first UE and the power measurements received of the second UE,
based on the correlation determined, determining whether the second UE is a neighbor to the first UE, and
performing an action responsive to determining that the second UE is a neighbor to the first UE.

13. The system network node according to claim 12, wherein the power measurements received of signals received at the first UE and the power measurements received of signals received at the second UE are only power measurements for the common group of base stations.

14. The system network node according to claim 12, wherein the system network node is operative for determining the common group of base stations by establishing a base station neighborhood matrix B comprising, in one column each, a plurality of base stations that are in the neighboring cell list of the first base station or in the neighboring cell list of the second base station, and, in one row each, the first base station and the second base station, in which in a first row, base stations of the plurality of base stations that are in the neighboring cell list of the first base station are marked, and in a second row, base stations of the plurality of base stations that are in the neighboring cell list of the second base station are marked, and determining the common group of base stations between the first and the second base station by detecting the columns where there is a mark in both the first row and the second row.

15. The system network node according to claim 12, wherein the system network node is operative for determining the common group of base stations by establishing a base station neighborhood matrix B comprising in one column each, the first base station, the second base station and a plurality of further base stations in the vicinity of the first UE or the second UE, and, in one row each, the first base station in a first row, the second base station in a second row and the plurality of further base stations in the vicinity of the first UE or the second UE in other rows, and for each row, marking the base stations that are in a neighboring cell list of that row's base station, and determining the common group of base stations between the first and the second base station by detecting the columns where there is a mark in both the first row and the second row.

16. The system network node according to claim 12, further being operative for sorting the power measurements received into power vectors, the power vectors comprising a first power vector for the first UE comprising the power measurements of the first UE in a base station order, and a second power vector for the second UE comprising the power measurements of the second UE in the base station order, and wherein the system network node being operative for determining of the correlation comprises the system network node being operative for comparing measurements of the first power vector for the first UE with measurements of the second power vector for the second UE.

17. The system network node according to claim 16, wherein the system network node is operative for determining the correlation by a normalized scalar product between the first power vector for the first UE and the second power vector for the second UE.

18. The system network node according to claim 12, further being operative for comparing the correlation determined to a correlation threshold, and wherein the system network node is operative for determining that the second UE is a neighbor to the first UE when the correlation determined is above the correlation threshold.

19. The system network node according to claim 12, further being operative for, when it has been determined that the second UE is a neighbor to the first UE, triggering sending of information to the first UE that the second UE is a neighbor to the first UE.

20. The system network node according to claim 12, further being operative for, when it has been determined that the second UE is a neighbor to the first UE, triggering sending the correlation determined of the second UE to the first UE.

21. A first user equipment, UE, configured to be wirelessly connected to a first base station of a wireless communication network, the first UE being operable for detecting neighboring UEs of the first UE, the first UE comprising a processor and a memory, said memory containing instructions, which when executed by said processor, causes the first UE to perform operations comprising:
sending, to the first base station, power measurements performed on signals received from base stations in a vicinity of the first UE and which are in a neighboring cell list of the first UE, each power measurement of a signal received being associated with an ID of a base station from which the signal was received;
receiving, from the first base station, information of one or more second UEs that are wirelessly connected to a different base station than the first base station, information indicating that the one or more second UEs have been determined to be a neighbor to the first UE based on correlations between the power measurements of the first UE and corresponding power measurements of individual second UEs of the one or more second UEs, wherein the information of the one or more second UEs indicates a priority order in which the first UE is to contact the one or more second UEs that is based on correlations between the power measurements of the first UE and corresponding power measurements of individual second UEs of the one or more second UEs, and
sending a signal to at least one of the one or more second UEs, based on the information received, for device to device communication with the at least one of the one or more second UEs, and
responsive to receiving an acknowledgement of the signal; establishing device to device communication with the at least one of the one or more second UEs.

22. A computer program product comprising a non-transitory computer readable medium storing computer readable code to be run in a system network node of a wireless communication network, configured for detecting neighboring UEs of a first UE that is wirelessly connected to a first base station of the wireless communication network, which computer readable code when run in the system network node causes the system network node to perform operations comprising:
determining a common group of base stations comprising a plurality of base stations that are in a vicinity of both the first UE and a second UE, each base station of the plurality of base stations being in both a neighboring cell list of the first UE and in a neighboring cell list of the second UE, wherein the second UE is wirelessly connected to a second base station of the wireless communication network, the second base station different from the first base station,
receiving power measurements performed on signals received at the first UE, which signals are sent from base stations in the common group of base stations, each power measurement of a signal received at the first UE being associated with an ID of the base station from which the signal was sent,
receiving power measurements of signals received at a second UE, which signals are sent from base stations in the common group of base stations, each power measurement of a signal received at the second UE being associated with an ID of the base station from which the signal was sent,
determining, for the common group of base stations, a correlation between the power measurements received of the first UE and the power measurements received of the second UE,
based on the correlation determined, determining whether the second UE is a neighbor to the first UE, and
performing an action responsive to determining that the second UE is a neighbor to the first UE.

23. A computer program product comprising a non-transitory computer readable medium storing computer readable code to be run in a first UE configured to be wirelessly connected to a first base station of a wireless communication network, the first UE being operable for detecting neighboring UEs of the first UE, which computer readable code when run in the first UE causes the first UE to perform operations comprising:
sending, to the first base station, power measurements performed on signals received from base stations in a vicinity of the first UE and which are in a neighboring cell list of the first UE, each power measurement of a signal received being associated with an ID of a base station from which the signal was received;
receiving, from the first base station, information of one or more second UEs that are wirelessly connected to a different base station than the first base station, information indicating that the one or more second UEs has been determined to be a neighbor to the first UE based on correlations between the power measurements of the first UE and corresponding power measurements of individual of the one or more second UEs, wherein the information of the one or more second UEs indicates a priority order in which the first UE is to contact the one or more second UEs that is based on correlations between the power measurements of the first UE and corresponding power measurements of individual second UEs of the one or more second UEs, sending a signal to at least one of the one or more second UEs, based on the information received, for device to device communication with the at least one of the one or more second UEs, and responsive to receiving an acknowledgement of the signal; establishing device to device communication with the at least one of the one or more second UEs.

* * * * *